(12) United States Patent
Yang et al.

(10) Patent No.: US 10,136,375 B2
(45) Date of Patent: Nov. 20, 2018

(54) METHOD FOR SERVICE DATA MANAGEMENT, APPARATUS, AND SYSTEM

(71) Applicant: HUAWEI TECHNOLOGIES CO., LTD., Shenzhen (CN)

(72) Inventors: Neng Yang, Shenzhen (CN); Xiaguang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 391 days.

(21) Appl. No.: 14/992,564

(22) Filed: Jan. 11, 2016

(65) Prior Publication Data

US 2016/0119848 A1 Apr. 28, 2016

Related U.S. Application Data

(63) Continuation of application No. PCT/CN2014/094913, filed on Dec. 25, 2014.

(30) Foreign Application Priority Data

Jul. 30, 2014 (CN) .......................... 2014 1 0372646

(51) Int. Cl.
*H04W 36/22* (2009.01)
*H04W 24/02* (2009.01)
(Continued)

(52) U.S. Cl.
CPC ............. *H04W 36/22* (2013.01); *H04L 67/16* (2013.01); *H04W 24/02* (2013.01); *H04W 28/0289* (2013.01); *H04W 92/045* (2013.01)

(58) Field of Classification Search
CPC ..... H04W 36/22; H04W 24/02; H04W 28/16; H04W 28/0289; H04W 72/00; H04W 92/045; H04L 67/16; H04L 2012/5631
See application file for complete search history.

(56) References Cited

U.S. PATENT DOCUMENTS 7,617,294 B1 * 11/2009 Harding ............ G06F 17/30905
370/229
8,369,328 B2 2/2013 Frydman et al.
(Continued)

FOREIGN PATENT DOCUMENTS

CN 101369967 A 2/2009
CN 101917742 8/2010
(Continued)

OTHER PUBLICATIONS

International Search Report dated May 4, 2015 in corresponding International Patent Application No. PCT/CN2014/094913.
(Continued)

*Primary Examiner* — Kibrom T Hailu
(74) *Attorney, Agent, or Firm* — Staas & Halsey LLP

(57) ABSTRACT

A service data management method. The method includes: receiving, by the NOA, a service request of a first user equipment UE, and forwarding the service request to the SP server by using the NOC, so that the SP server returns service data requested by the first UE; determining, by the NOA, that the service data has been stored in the NOA, and sending hit indication information to the NOC, so that the NOC replaces a data segment in the service data with preconfigured replacement information, where bandwidth occupied by the preconfigured replacement information is smaller than bandwidth occupied by the data segment; and determining, by the NOA, a corresponding data segment according to received replacement information, and sending the data segment, which has been stored, to the first UE. Solutions provided in embodiments of the present invention can reduce the backhaul bandwidth occupancy.

27 Claims, 22 Drawing Sheets

(51) Int. Cl.
*H04L 29/08* (2006.01)
*H04W 28/02* (2009.01)
*H04W 92/04* (2009.01)

(56) References Cited

U.S. PATENT DOCUMENTS

| | | | | |
|---|---|---|---|---|
| 9,407,716 | B1* | 8/2016 | Desai | H04L 61/10 |
| 2005/0088989 | A1 | 4/2005 | Lee et al. | |
| 2005/0102300 | A1* | 5/2005 | Madsen | G06F 17/30902 |
| 2011/0007705 | A1* | 1/2011 | Buddhikot | H04L 63/02 |
| | | | | 370/331 |
| 2012/0054295 | A1* | 3/2012 | Cai | H04L 67/02 |
| | | | | 709/213 |
| 2012/0191804 | A1* | 7/2012 | Wright | G06F 17/30902 |
| | | | | 709/217 |
| 2013/0097309 | A1* | 4/2013 | Ma | H04L 29/08099 |
| | | | | 709/224 |
| 2014/0025837 | A1* | 1/2014 | Swenson | H04L 29/06027 |
| | | | | 709/231 |
| 2014/0056137 | A1 | 2/2014 | Kovvali et al. | |
| 2014/0136604 | A1* | 5/2014 | Lee | H04L 67/02 |
| | | | | 709/203 |
| 2014/0280679 | A1* | 9/2014 | Dey | H04L 67/2842 |
| | | | | 709/213 |
| 2014/0310339 | A1 | 10/2014 | Yong et al. | |
| 2015/0003234 | A1* | 1/2015 | Samardzija | H04L 67/2847 |
| | | | | 370/229 |
| 2015/0032974 | A1* | 1/2015 | Deakin | H04W 36/0011 |
| | | | | 711/146 |
| 2015/0222725 | A1* | 8/2015 | Xu | H04L 67/06 |
| | | | | 709/213 |

FOREIGN PATENT DOCUMENTS

| | | |
|---|---|---|
| CN | 102594875 | 7/2012 |
| CN | 103430516 A | 12/2013 |
| CN | 104159249 A | 11/2014 |
| EP | 2 713 649 A1 | 4/2014 |
| EP | 2 775 690 A1 | 9/2014 |
| EP | 2 953 400 A1 | 12/2015 |
| WO | 2013/104237 A1 | 7/2013 |

OTHER PUBLICATIONS

Extended European Search Report dated Jul. 4, 2016 in corresponding European Patent Application No. 14896956.1.

Office Action, dated Mar. 1, 2017, in Chinese Application No. 201410372646.2 (5 pp.).

* cited by examiner

METHOD FOR SERVICE DATA MANAGEMENT, APPARATUS, AND SYSTEM

CROSS-REFERENCE TO RELATED APPLICATIONS

This application is a continuation of International Application No. PCT/CN2014/094913, filed on Dec. 25, 2014, which claims priority to Chinese Patent Application No. 201410372646.2, filed on Jul. 30, 2014, both of which are hereby incorporated by reference in their entireties.

TECHNICAL FIELD

The present invention relates to the field of communications technologies, and in particular, to a method for service data management, an apparatus, and a system.

BACKGROUND

In a wireless network, a backhaul (backhaul) is used by a core network to transfer voice and data traffic to a base station side. Specifically, in a Long Term Evolution (Long Term Evolution, LTE) network, a backhaul is a link between an evolved base station (eNodeB) and an evolved packet core (Evolved Packet Core, EPC). A user equipment (User Equipment, UE) accesses a mobile network through a radio access network (Radio Access Network, RAN) to obtain a service.

When a user browses a web page by using a UE, the UE sends a service request to an eNodeB to request service data, where the service request is sent by the eNodeB to a service provider (Service Provider, SP) server on a core network side. A device on the core network side completes charging the UE for the service data requested by the UE. Next, the SP server sends the service data requested by UE to the eNodeB, and the eNodeB sends the service data to the UE.

As a result, no matter whether a same UE requests or different UEs request same service data, the SP server needs to send the service data to the eNodeB each time, which causes huge data traffic on a Backhaul and occupies a large amount of Backhaul bandwidth resources.

SUMMARY

To solve a problem of excessively large data traffic of a Backhaul in the prior art, the present invention provides a service data management method, to reduce the data volume of a Backhaul, and further reduce the Backhaul bandwidth occupancy. Embodiments of the present invention further provide a corresponding apparatus and system.

According to a first aspect, an embodiment of the present invention provides a service data management method, where the method is applied to a wireless communications system, the wireless communications system includes: a base station, a gateway, a network optimization agent NOA, a network optimization controller NOC, and a service provider SP server, the NOA is deployed on the base station side, the NOC is deployed on the gateway side, and the method includes:

receiving, by the NOA, a service request of a first user equipment UE, and forwarding the service request to the SP server by using the NOC, so that the SP server returns, according to the service request, service data requested by the first UE;

determining, by the NOA, whether the service data has been stored in the NOA; and if determining that the service data has been stored in the NOA, sending hit indication information to the NOC, so that the NOC replaces a data segment in the service data with preconfigured replacement information according to the hit indication information, where bandwidth occupied by the preconfigured replacement information is smaller than bandwidth occupied by the data segment; and receiving the replacement information sent by the NOC, determining the corresponding data segment according to the replacement information, and sending the data segment, which has been stored, to the first UE.

In a first possible implementation manner of the first aspect, the method further includes:

if determining that the service data is not stored in the NOA, sending miss indication information to the NOC, so that the NOC sends a data segment included in the service data to the NOA according to the miss indication information, receiving the data segment from the NOC, and storing the received data segment to the NOA; and when a second UE requests the service data, sending, by the NOA to the second UE, the data segment that has been stored.

With reference to the first possible implementation manner of the first aspect, in a second possible implementation manner, that the SP server returns service data requested by the first UE includes:

adding, by the SP server, the data segment included in the service data to one or more response packets, and sending the one or more response packets to the NOC; and the determining whether the service data has been stored in the NOA includes:

receiving a first response packet sent by the NOC, where the first response packet carries a first data segment segment in the service data requested by the first UE;

generating first index information according to the first data segment;

querying whether the first index information has been stored in the NOA; and if the first index information has been stored in the NOA, determining that the service data has been stored in the NOA;

if the first index information is not stored in the NOA, determining that the service data is not stored in the NOA.

With reference to the first possible implementation manner of the first aspect, in a third possible implementation manner, the determining whether the service data has been stored in the NOA includes:

parsing the service request to obtain a service identifier;

generating second index information according to the service identifier;

querying whether the second index information has been stored in the NOA; and if the second index information has been stored in the NOA, determining that the service data has been stored in the NOA;

if the second index information is not stored in the NOA, determining that the service data is not stored in the NOA.

According to a second aspect, an embodiment of the present invention provides a service data management method, where the method is applied to a wireless communications system, the wireless communications system includes: a base station, a gateway, a network optimization agent NOA, a network optimization controller NOC, and a service provider SP server, the NOA is deployed on the base station side, the NOC is deployed on the gateway side, and the method includes:

receiving, by the NOC, a service request that is of a first user equipment UE and is forwarded by the NOA, and forwarding the service request to the SP server, so that the SP server returns, according to the service request, service data requested by the first UE; and when receiving hit indication information sent by the NOA, replacing a data segment in the service data with preconfigured replacement information according to the hit indication information, where bandwidth occupied by the preconfigured replacement information is smaller than bandwidth occupied by the data segment, and sending the replacement information to the NOA, so that the NOA queries the corresponding data segment according to the replacement information, and sends the data segment, which has been stored, to the first UE.

In a first possible implementation manner of the second aspect, the method further includes:

when receiving miss indication information, sending a data segment included in the service data to the NOA according to the miss indication information, so that the NOA stores the received data segment to the NOA, and when a second UE requests the service data, the NOA sends the data segment, which has been stored, to the second UE.

According to a third aspect, an embodiment of the present invention provides a network optimization agent NOA, where the NOA is applied to a wireless communications system, the wireless communications system further includes: a base station, a gateway, a network optimization controller NOC, and a service provider SP server, the NOA is deployed on the base station side, the NOC is deployed on the gateway side, and the NOA includes:

a receiving unit, configured to receive a service request of a first user equipment UE;

a sending unit, configured to forward the service request received by the receiving unit to the SP server by using the NOC, so that the SP server returns, according to the service request, service data requested by the first UE; and a determining unit, configured to determine whether the service data has been stored in the NOA, where the sending unit is further configured to: when the determining unit determines that the service data has been stored in the NOA, send hit indication information to the NOC, so that the NOC replaces a data segment in the service data with preconfigured replacement information according to the hit indication information, where bandwidth occupied by the preconfigured replacement information is smaller than bandwidth occupied by the data segment;

the receiving unit is further configured to receive the replacement information sent by the NOC;

the determining unit is further configured to determine the corresponding data segment according to the replacement information received by the receiving unit; and the sending unit is further configured to send the data segment that has been stored and is determined by the determining unit to the first UE.

In a first possible implementation manner of the third aspect, the sending unit is further configured to: when the determining unit determines that the service data is not stored in the NOA, send miss indication information to the NOC, so that the NOC sends a data segment included in the service data to the NOA according to the miss indication information;

the receiving unit is further configured to receive the data segment from the NOC;

a storage unit is configured to store the data segment received by the receiving unit; and the sending unit is further configured to: when a second UE requests the service data, send the data segment that has been stored by the storage unit to the second UE.

With reference to the first possible implementation manner of the third aspect, in a second possible implementation manner, the SP server adds the data segment included in the service data to one or more response packets, and sends the one or more response packets to the NOC; and the determining unit includes:

a receiving subunit, configured to receive a first response packet sent by the NOC, where the first response packet carries a first data segment in the service data requested by the first UE;

a first generating subunit, configured to generate first index information according to the first data segment received by the receiving subunit;

a first query subunit, configured to query whether the first index information generated by the first generating subunit has been stored in the NOA; and a first determining subunit, configured to: when the first query subunit queries that the first index information has been stored in the NOA, determine that the service data has been stored in the NOA; when the first query subunit queries that the first index information is not stored in the NOA, determine that the service data is not stored in the NOA.

With reference to the first possible implementation manner of the third aspect, in a third possible implementation manner, the determining unit includes:

a parsing subunit, configured to parse the service request to obtain a service identifier;

a second generating subunit, configured to generate second index information according to the service identifier obtained by the parsing subunit by parsing;

a second query subunit, configured to query whether the second index information generated by the second generating subunit has been stored in the NOA; and a second determining subunit, configured to: when the second query subunit queries that the second index information has been stored in the NOA, determine that the service data has been stored in the NOA; when the second query subunit queries that the second index information is not stored in the NOA, determine that the service data is not stored in the NOA.

According to a fourth aspect, an embodiment of the present invention provides a network optimization controller NOC, where the NOC is applied to a wireless communications system, the wireless communications system further includes: a base station, a gateway, a network optimization agent NOA, and a service provider SP server, the NOA is deployed on the base station side, the NOC is deployed on the gateway side, and the NOC includes:

a receiving unit, configured to receive a service request that is of a first user equipment UE and is forwarded by the NOA;

a sending unit, configured to forward the service request received by the receiving unit to the SP server, so that the SP server returns, according to the service request, service data requested by the first UE, where the receiving unit is further configured to receive hit indication information sent by the NOA; and a replacing unit, configured to: when the receiving unit receives the hit indication information sent by the NOA, replace a data segment in the service data with preconfigured replacement information according to the hit indication information, where bandwidth occupied by the preconfigured replacement information is smaller than bandwidth occupied by the data segment, where the sending unit is further configured to send the replacement information replaced by the replacing unit to the NOA, so that the NOA queries the corresponding data segment according to the replacement information, and sends the data segment, which has been stored, to the first UE.

In a first possible implementation manner of the fourth aspect, the receiving unit is further configured to receive miss indication information; and the sending unit is further configured to: when the receiving unit receives the miss indication information, send a data segment included in the service data to the NOA according to the miss indication information, so that the NOA stores the received data segment to the NOA, and when a second UE requests the service data, the NOA sends the data segment, which has been stored, to the second UE.

According to a fifth aspect, an embodiment of the present invention provides a wireless communications system, including: a base station, a gateway, a network optimization agent NOA, a network optimization controller NOC, and a service provider SP server, where the NOA is deployed on the base station side, and the NOC is deployed on the gateway side, the NOA is the NOA in any one of the foregoing NOA technical solutions; and the NOC is the NOC in any one of the foregoing NOC technical solutions.

Compared with the prior art, in the service data management method provided in the embodiments of the present invention, a network optimization agent NOA is deployed on a base station side, and a network optimization controller NOC is deployed on a gateway side, to manage service data; in this way, when service data is requested for a first time, the network optimization agent NOA stores the service data, so that when the service data is requested for a second time, the network optimization controller NOC does not need to send the service data one more time, and instead, the NOA sends the service data to a UE, which reduces the data volume of a Backhaul, thereby reducing the Backhaul bandwidth occupancy.

BRIEF DESCRIPTION OF DRAWINGS

To describe the technical solutions in embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a service data management method, to reduce the data volume of a Backhaul, and further reduce the Backhaul bandwidth occupancy. The embodiments of the present invention further provide a corresponding apparatus and system. Detailed descriptions are provided in the following.

To make a person skilled in the art understand the technical solutions in the present invention better, the following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Figure 1:
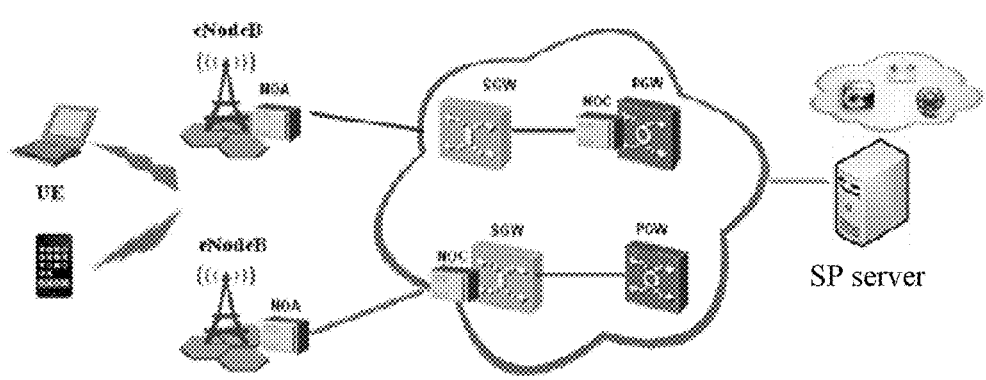
FIG. 1 is a schematic diagram of an embodiment of a service data management method in the embodiments of the present invention.

The service data management method provided in the embodiments of the present invention is applied to a wireless communications system. As shown in FIG. 1, the wireless communications system includes an evolved base station eNodeB, a packet data network gateway (Packet Data Network gateway, PGW), a serving gateway (serving gateway, SGW), a network optimization agent (Network Optimization Agent, NOA), a network optimization controller (Network Optimization Controller, NOC), and a service provider (service provider, SP) server, the NOA is deployed on the evolved base station eNodeB side, and the NOC is deployed before the packet data network gateway (Packet Data Network gateway, PGW) or serving gateway (serving gateway, SGW) of a core network. The SP server is configured to provide service data, such as video content and web page content. A user equipment may be a terminal device such as a mobile phone, a notebook computer, or a personal computer (Personal Computer, PC).

Service data in the embodiments of the present invention may be video data, audio data, web page data, or the like.

Figure 2:
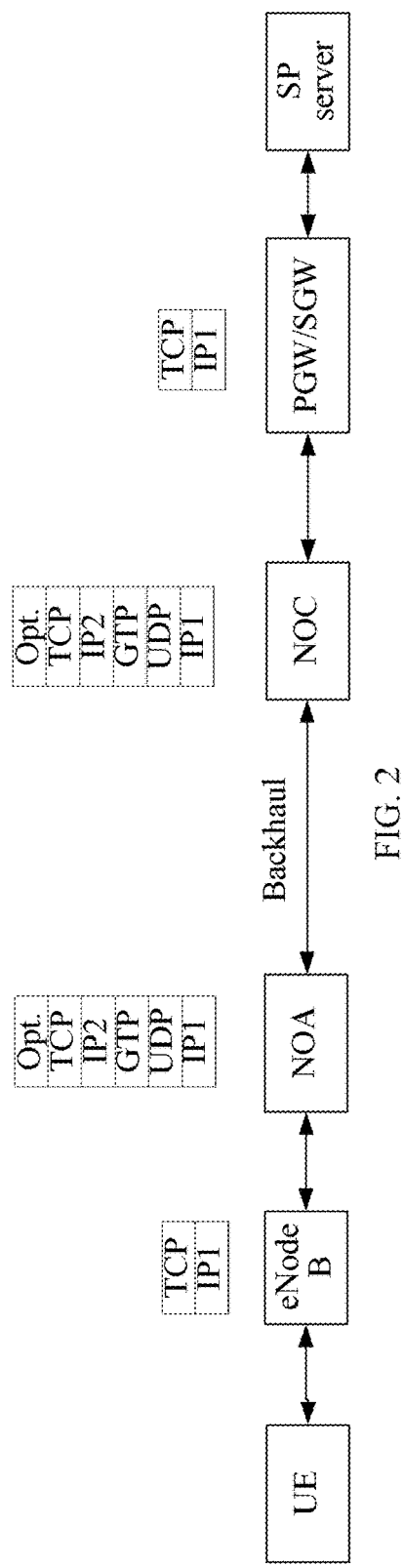
FIG. 2 is a schematic diagram of another embodiment of a service data management method in the embodiments of the present invention.

As shown in FIG. 2, a link between the eNodeB and the PGW (Packet Data Network Gateway, packet data network gateway)/SGW (Serving Gateway, serving gateway) is a backhaul (backhaul) link, communication can be implemented among the user equipment (User Equipment, UE), the eNodeB, the NOA, the NOC, the PGW/SGW, and the SP server by using the Transmission Control Protocol (Transmission Control Protocol, TCP) and the Internet Protocol (Internet Protocol, IP). The NOA may further communicate with the NOC by using the User Datagram Protocol (User Datagram Protocol, UDP) or the General Packet Radio Service Tunnel Protocol (General Packet Radio Service Tunnel Protocol, GTP).

An option part of a TCP header can reach 40 bytes at most. Therefore, in the embodiments of the present invention, an Option field defined in the TCP protocol is used to transmit replacement information and index information.

Figure 3:
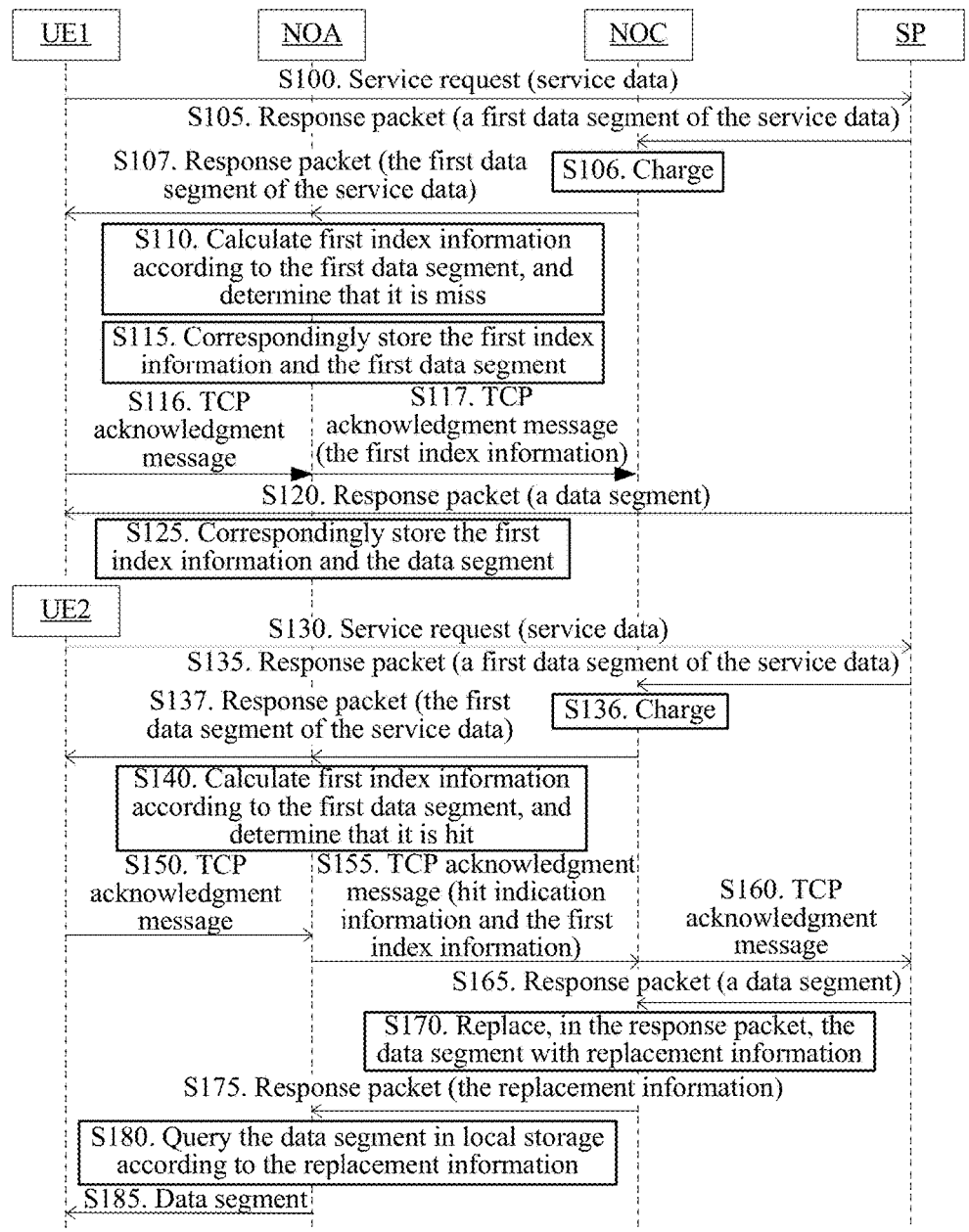
FIG. 3 is a schematic diagram of another embodiment of a service data management method in the embodiments of the present invention.

Referring to FIG. 3, an embodiment of the service data management method provided in the embodiments of the present invention includes:

S100: A UE1 sends a service request to an SP server by using an NOA and an NOC, where the service request is used for requesting service data.

The service data may be video data, audio data, web page data, or the like.

S105: The SP server sends a first response packet to the NOC, where the first response packet carries a first data segment of the service data.

S106: The NOC charges the UE1 for the service data.

S107: The NOC sends the first response packet to the NOA, and the NOA sends the first response packet to the UE1, where the first response packet carries the first data segment segment in the service data.

S110: The NOA calculates first index information of the service data according to the first data segment segment, and determines, according to the first index information, that the service data is miss.

The first index information may be calculated by using an information digest algorithm, or may be calculated by using another algorithm.

In this embodiment of the present invention, miss refers to that the service data is not stored in the NOA, and hit refers to that the service data is stored in the NOA. During storage, the first index information and the service data are correspondingly stored. Therefore, after obtaining the first index information through calculation, the NOA can determine, according to a correspondence between the first index information and the service data, whether the service data is stored in the NOA. If it is determined that the service data is not stored, it is determined as miss.

S115: Correspondingly store the first index information and the first data segment segment.

S116: The UE sends a TCP acknowledgment message to the NOA.

S117: The NOA adds the first index information to the acknowledgment message.

The first index information may be added to an Option field of the TCP.

S120: The SP server continues to send a data segment in the service data by using a response packet, the NOC sends the data segment to the NOA, and the NOA then sends the data segment to the UE.

S125: The NOA correspondingly stores the data segment of the service data and the first index information.

Actually, it may only send one data segment each time, and sending may be performed multiple times, but each process is the same as S120 and S125, and is not described herein again.

When correspondingly storing the first index information and the data segment, the NOA may query, by using a session identifier, for the first index information corresponding to the data segment. In one session process, a session identifier is unique.

A process of storing a data segment by the NOA may be understood as a process of injecting service data. Service data generally is injected step by step, and data with a quite small number of bytes may also be injected once for all.

S130: When the service data is injected in the NOA, a UE2 sends a request to the SP server to request service data the same as that requested by the UE1.

S135: The SP server sends the first response packet to the NOC, where the response packet carries the first data segment segment of the service data.

S136: The NOC charges the UE2 for the service data.

S137: The NOC sends the first response packet to the NOA, and the NOA sends the first response packet to the UE2, where the first response packet carries the first data segment segment of the service data.

S140: The NOA calculates first index information of the service data according to the first data segment, and determines, according to the first index information, that the service data is hit.

S50: The UE2 sends a TCP acknowledgment message to the NOA.

S155: The NOA sends the TCP acknowledgment message to the NOC, and adds hit indication information to an option field of the TCP acknowledgment message, so that the NOC replaces a data segment in the service data with preconfigured replacement information according to the hit indication information, where bandwidth occupied by the preconfigured replacement information is smaller than bandwidth occupied by the data segment.

The replacement information may be an identifier, or may be an index.

S160: The NOC sends the TCP acknowledgment message to the SP server.

S165: The SP server continues to send a data segment in the service data to the NOC by using a response packet.

S170: The NOC replaces, in the response packet, the data segment with preconfigured replacement information according to the hit indication information.

Bandwidth occupied by the preconfigured replacement information is smaller than bandwidth occupied by the data segment.

In this embodiment of the present invention, the replacement information may only have 4 bytes or less bytes, and occupied backhaul bandwidth is far smaller than the bandwidth occupied by the data segment; therefore, the data volume of a Backhaul can be reduced, thereby reducing the bandwidth occupancy.

S175: The NOC sends the response packet to the NOA, where the response packet carries the replacement information.

S180: The NOA queries the data segment in local storage according to the replacement information.

It may be determined, according to the replacement information, that the data segment is stored in the local storage, and then the data segment of the service data is queried according to a session identifier of a current session.

S185: The NOA sends the data segment obtained by query to the UE2.

In this embodiment of the present invention, after a first data segment of service data requested by a UE1 is injected in an NOA, when a UE2 requests service data the same as the service data requested by the UE1, actually, the NOA gradually sends a data segment of the service data to the UE2 by obtaining the data segment from a stored data segment, and an NOC does not need to send the service data, which reduces the data volume of a Backhaul, thereby saving bandwidth.

Figure 4:
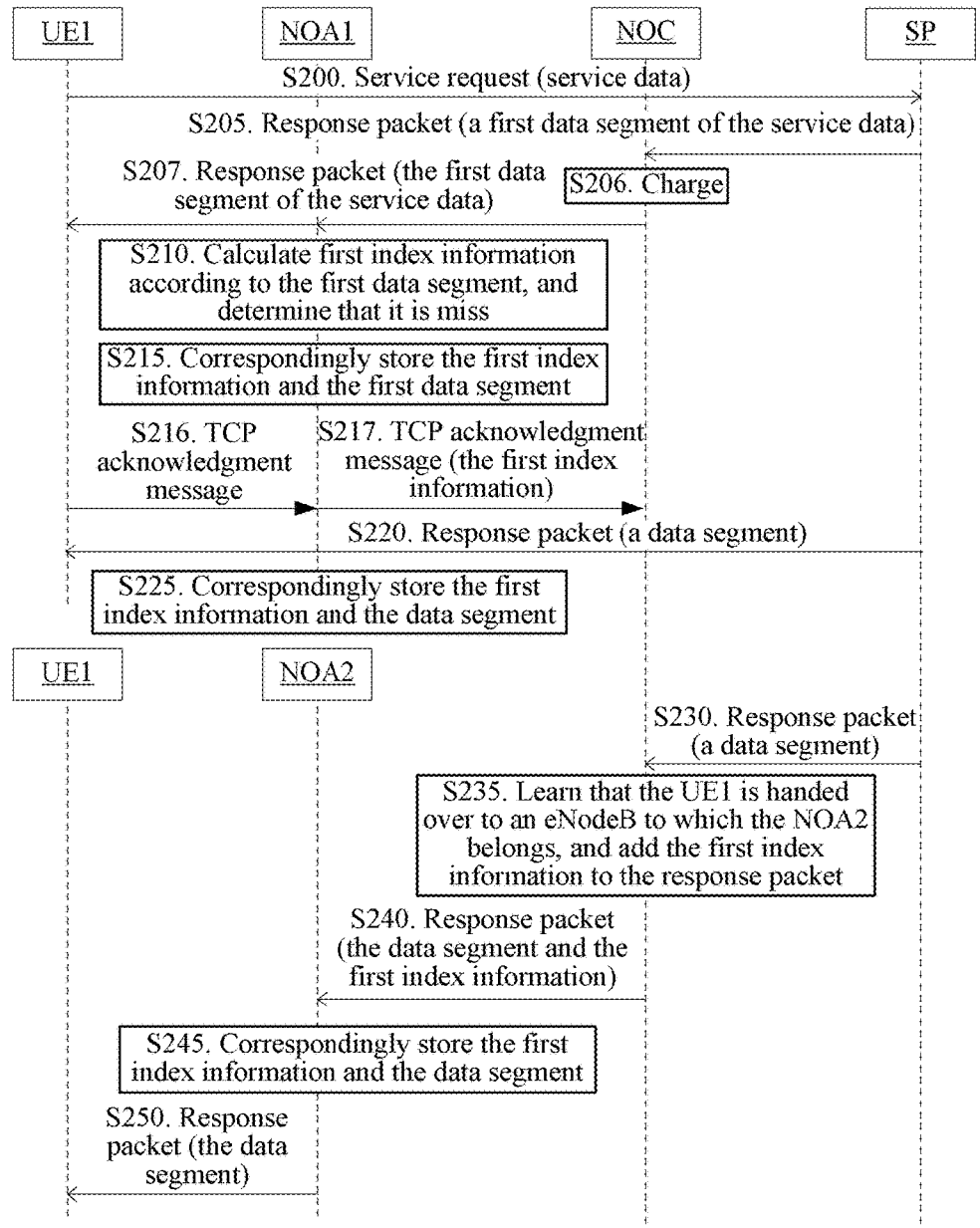
FIG. 4 is a schematic diagram of another embodiment of a service data management method in the embodiments of the present invention.

Referring to FIG. 4, another embodiment of the service data management method provided in the embodiments of the present invention includes:

Steps S200 to S225 are the same as the described content of S100 to S125, and are not described herein again.

A solution provided in this embodiment of the present invention is applied to a case in which when an NOA1 stores service data requested by a UE1, the UE1 is handed over to another eNodeB, where an NOA2 is deployed on the another eNodeB side.

S230: The SP server continues to send a data segment to the NOC by using a response packet.

S235: The NOC learns that the UE1 is handed over to another eNodeB, where an NOA2 is deployed on the another eNodeB side, and the NOC adds the first index information to the response packet.

S240: The NOC sends the first index information and a data segment that has not been stored to the NOA1 and is in the service data to the NOA2.

S245: Correspondingly store the first index information and the data segment that has not been stored to the NOA1 and is in the service data.

S250: The NOA2 sends the data segment to the UE1.

In this embodiment of the present invention, when a UE1 is handed over to another eNodeB in a process of injecting service data in an NOA1, where an NOA2 is deployed on the another eNodeB side, a remaining data segment that has not been injected in the NOA1 is injected in the NOA2.

Figure 5:
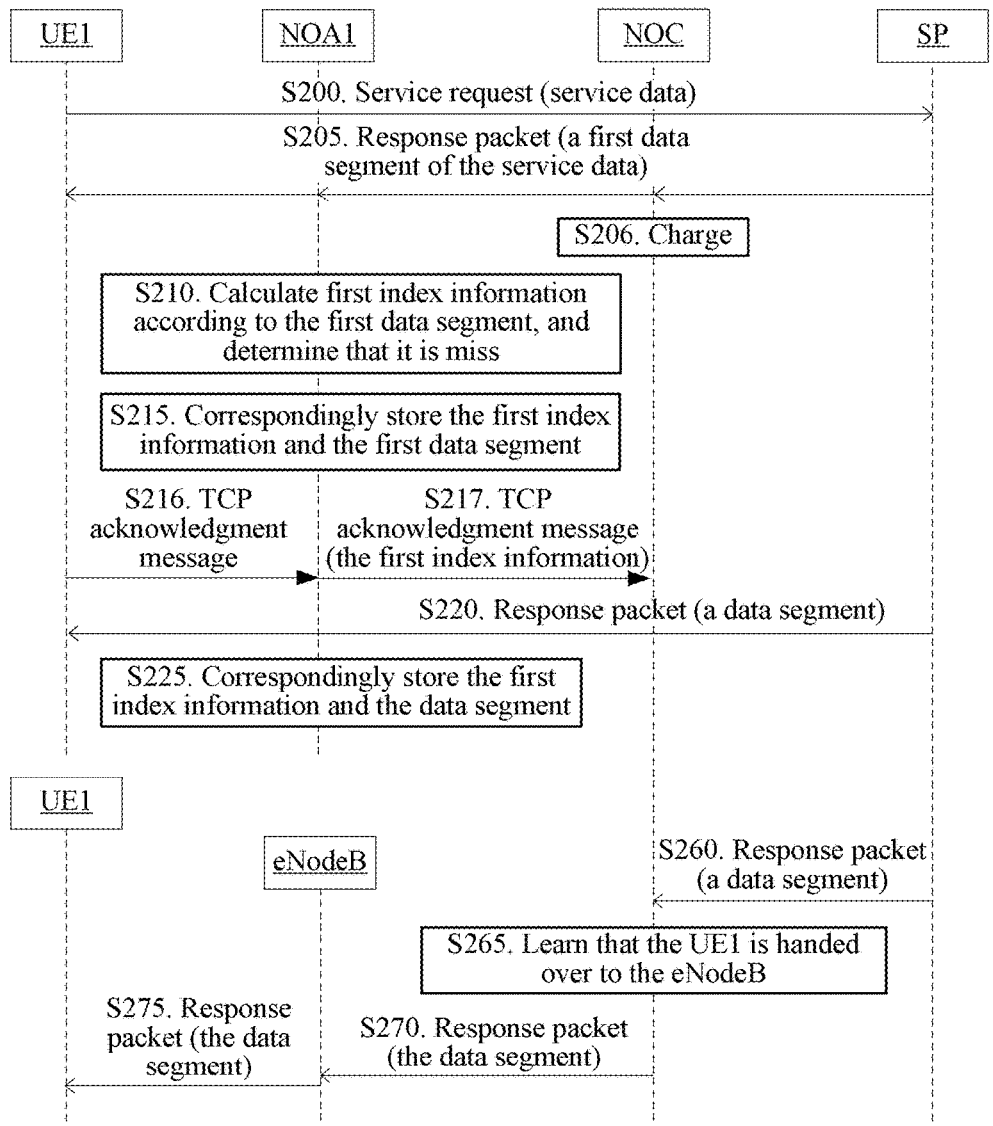
FIG. 5 is a schematic diagram of another embodiment of a service data management method in the embodiments of the present invention.

Referring to FIG. 5, another embodiment of the service data management method provided in the embodiments of the present invention includes:

Steps S200 to S225 are the same as the described content of S200 to S225 shown in FIG. 4, and are not described herein again.

A solution provided in this embodiment of the present invention is applied to a case in which when service data requested by a UE1 is injected in an NOA1, the UE1 is handed over to another eNodeB, where no other NOA is deployed on the another eNodeB side.

S260: The SP server continues to send a data segment to the NOC by using a response packet.

S265: The NOC learns that the UE1 is handed over to another eNodeB.

S270: The NOC sends the data segment to the another eNodeB by using the response packet.

S275: The another eNodeB forwards the data segment to the UE1.

In this embodiment of the present invention, when a UE1 is handed over to another eNodeB in a process of injecting service data in an NOA1, where no NOA is deployed on the another eNodeB side, an NOC directly sends a response packet carrying a data segment to the another eNodeB, and the another eNodeB forwards the data segment to the UE1.

Figure 6:
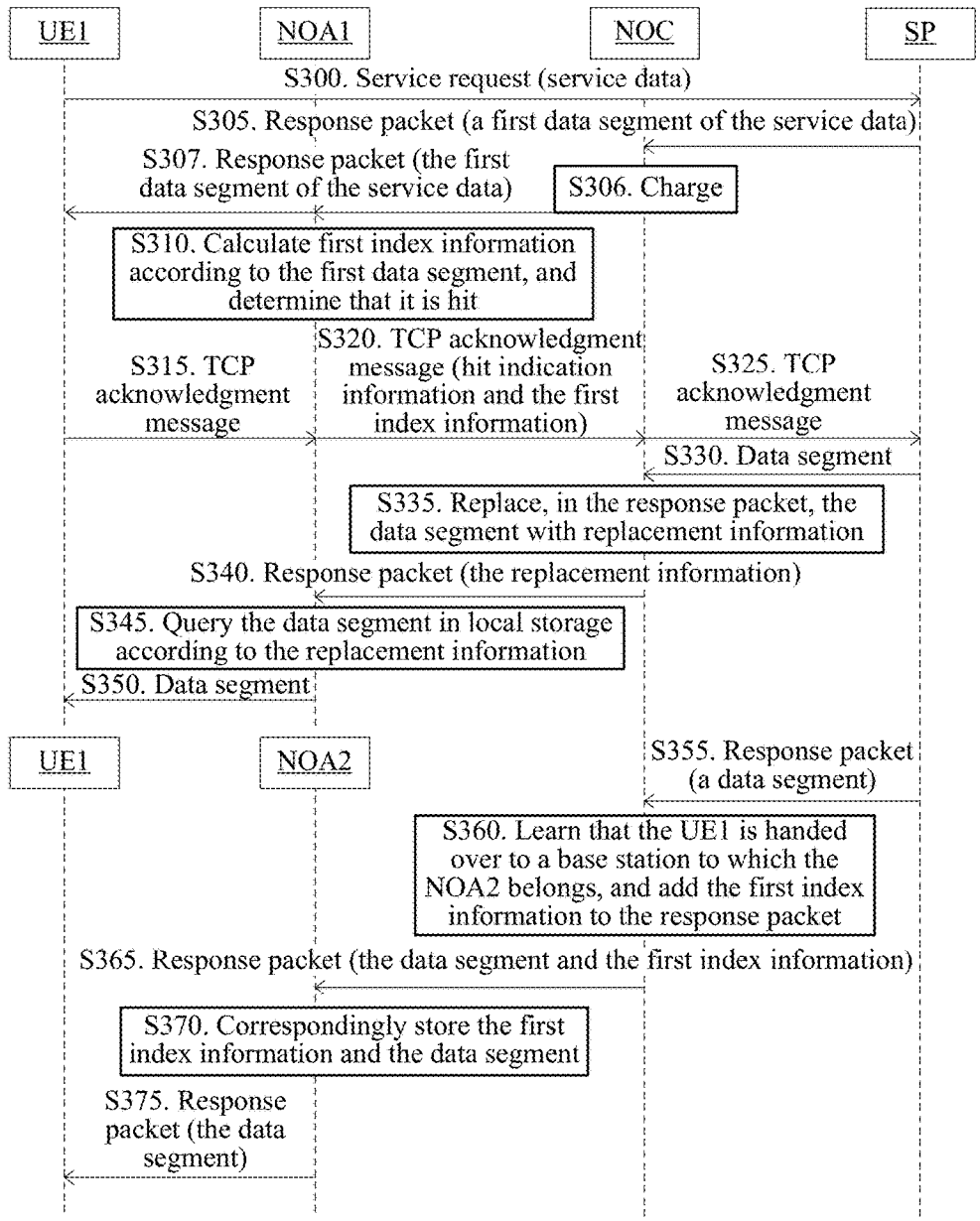
FIG. 6 is a schematic diagram of another embodiment of a service data management method in the embodiments of the present invention.

Referring to FIG. 6, another embodiment of the service data management method provided in the embodiments of the present invention includes:

Steps S300 to S350 are the same as the described content of S130 to S185 shown in FIG. 3, and are not described herein again.

A solution provided in this embodiment of the present invention is applied to a case in which service data requested by a UE1 has been stored in an NOA1, and when the NOA1 sends a data segment to the UE1, the UE1 is handed over to another eNodeB, where an NOA2 is deployed on the another eNodeB side, and the NOA2 does not have the service data stored.

S355: The SP server continues to send a data segment to the NOC by using a response packet.

S360: The NOC learns that the UE1 is handed over to another eNodeB, where an NOA2 is deployed on the another eNodeB side, and the NOC adds the first index information to the response packet.

S365: The NOC sends the first index information and a data segment that has not been sent by the NOA1 to the UE1 and is in the service data to the NOA2.

S370: Correspondingly store the first index information and the data segment that has not been sent by the NOA1 to the UE1.

S375: The NOA2 sends the data segment to the UE1.

In this embodiment of the present invention, when a UE1 is handed over to another eNodeB in a process of sending, by an NOA1 to the UE1, service data that has been stored, where an NOA2 is deployed on the another eNodeB side, a data segment that has not been sent by the NOA1 to the UE1 and is in the service data is injected in the NOA2.

Figure 7:
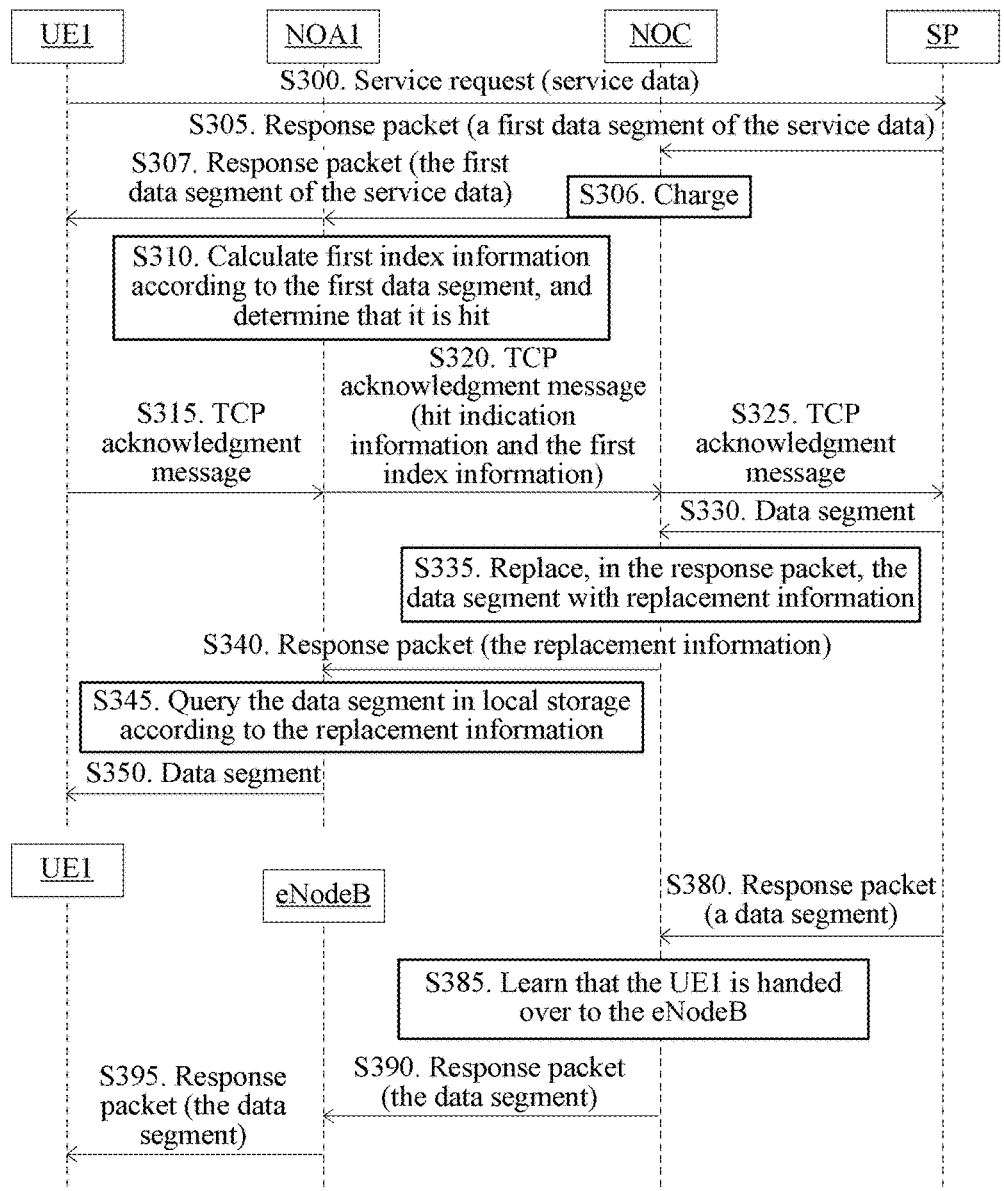
FIG. 7 is a schematic diagram of another embodiment of a service data management method in the embodiments of the present invention.

Referring to FIG. 7, another embodiment of the service data management method provided in the embodiments of the present invention includes:

Steps S300 to S350 are the same as the described content of S130 to S185 shown in FIG. 3, and are not described herein again.

A solution provided in this embodiment of the present invention is applied to a case in which service data requested by a UE1 has been stored in an NOA1, and when the NOA1 sends a data segment to the UE1, the UE1 is handed over to another eNodeB, where no NOA is deployed on the another eNodeB side.

S380: The SP server continues to send a data segment to the NOC by using a response packet.

S385: The NOC learns that the UE1 is handed over to another eNodeB.

S390: The NOC sends the data segment to the another eNodeB by using the response packet.

S395: The another eNodeB forwards the data segment to the UE1.

In this embodiment of the present invention, when a UE1 is handed over to another eNodeB in a process of sending, by an NOA1 to the UE1, service data that has been stored, where no NOA is deployed on the another eNodeB side, an NOC directly sends a response packet carrying a data segment to the another eNodeB, and the another eNodeB forwards the data segment to the UE1.

Figure 8:
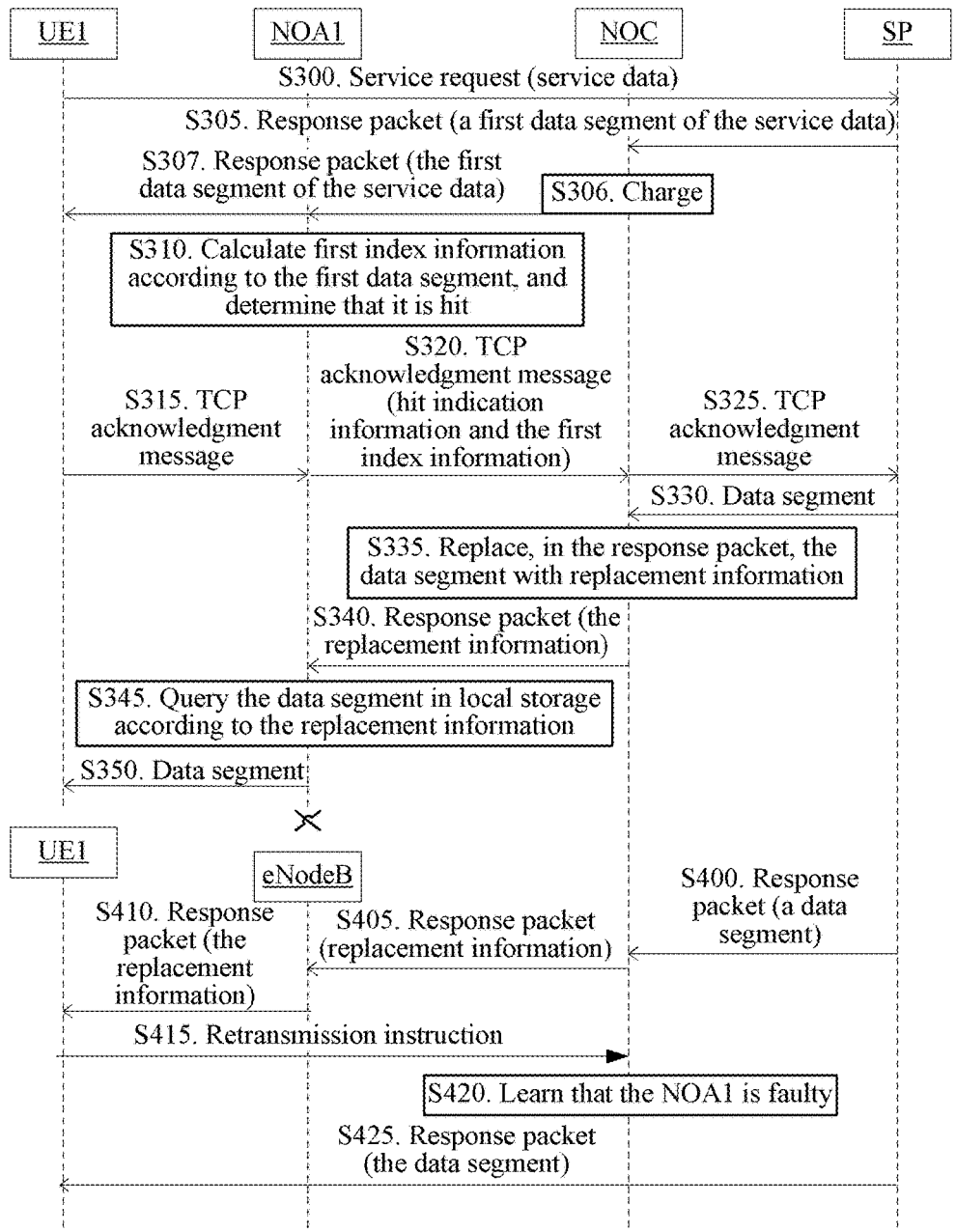
FIG. 8 is a schematic diagram of another embodiment of a service data management method in the embodiments of the present invention.

Referring to FIG. 8, another embodiment of the service data management method provided in the embodiments of the present invention includes:

Steps S300 to S350 are the same as the described content of S130 to S185 shown in FIG. 3, and are not described herein again.

A solution provided in this embodiment of the present invention is applied to a case in which an NOA1 is faulty in a process of sending, by the NOA1 to a UE1, service data that has been stored, and a process of S400 to S425 is executed:

S400: The SP server continues to send a data segment to the NOC by using a response packet.

S405: The NOC sends the response packet to an eNodeB, where the response packet carries replacement information.

S410: The eNodeB sends the response packet to the UE1, where the response packet carries the replacement information.

S415: The UE1 learns a data transmission error, and sends a retransmission instruction to the NOC by using the eNodeB.

S420: The NOC learns that the NOA1 is faulty, and in a subsequent response packet, does not replace a data segment with replacement information.

S425: The SP server sends a data segment to the UE1 by using the NOC and the eNodeB.

In all of the foregoing embodiments provided by FIG. 3 to FIG. 8, the NOA calculates the first index information according to the first data segment of the requested service data in the process of responding by the SP server.

Figure 9:
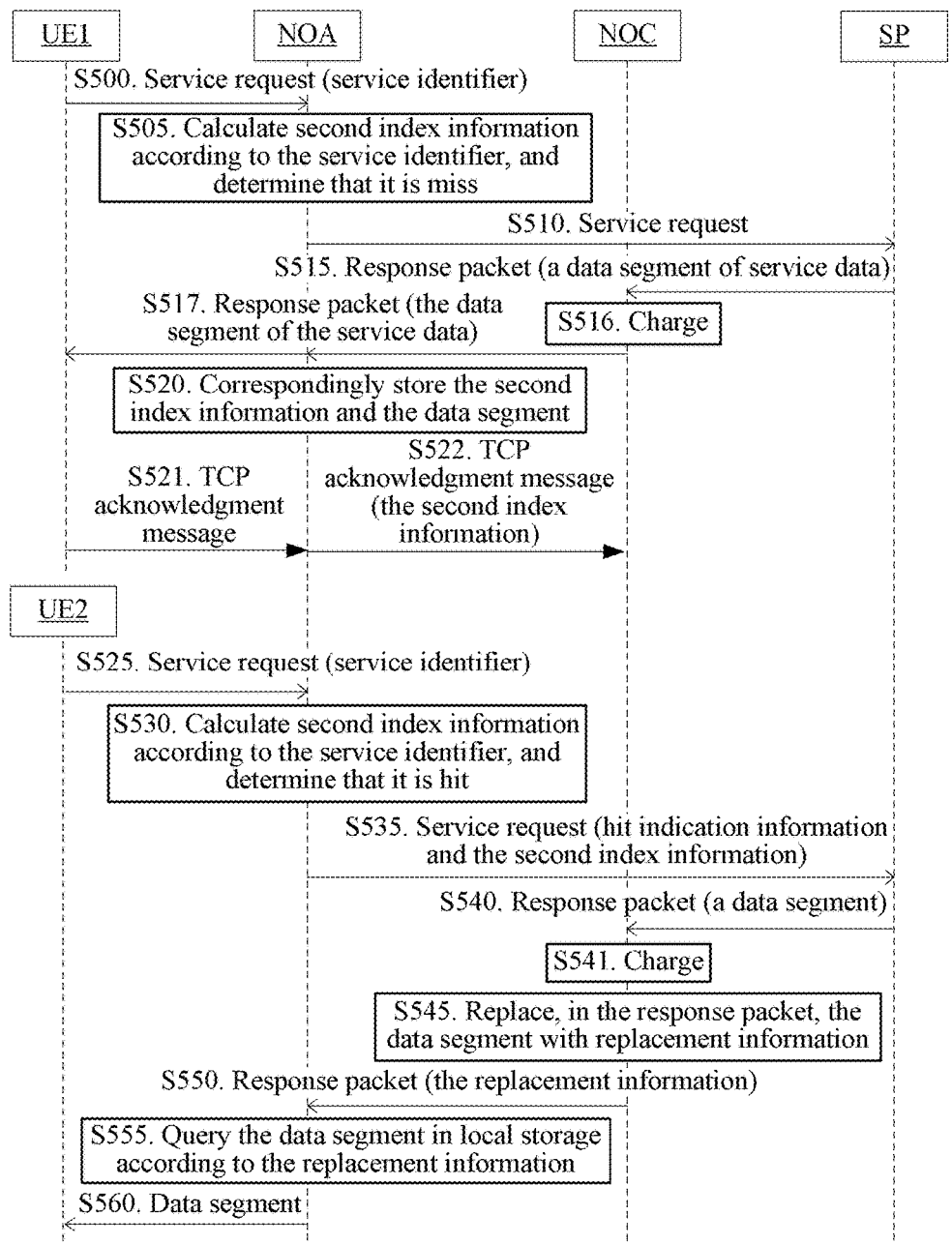
FIG. 9 is a schematic diagram of another embodiment of a service data management method in the embodiments of the present invention.

Referring to FIG. 9, another embodiment of the service data management method provided in the embodiments of the present invention includes:

S500: A UE1 sends a service request to an NOA, where the service request carries a service identifier.

The service identifier in this embodiment of the present invention may be a web page address (Uniform Resource Locator, URL), a unique identifier of a video, or a unique identifier of audio.

S505: The NOA calculates second index information according to the service identifier, and determines, according to the second index information, whether service data requested by the service request is stored in the NOA.

The second index information may be calculated by using an information digest algorithm, or may be calculated by using another algorithm In this embodiment of the present invention, miss refers to that the service data is not stored in the NOA, and hit refers to that the service data is stored in the NOA. During storage, the first index information and the service data are correspondingly stored. Therefore, after obtaining the first index information through calculation, the NOA can determine, according to a correspondence between the first index information and the service data, whether the service data is stored in the NOA. If it is determined that the service data is not stored, it is determined as miss.

S510: The NOA sends the service request to an SP server by using an NOC.

S515: The SP server sends, step by step, a data segment of the service data by using a response packet.

S516: The NOC charges the UE1 for the service data.

S517: The NOC sends the response packet to the NOA, and the NOA sends the response packet to the UE, where the response packet carries the data segment of the service data.

S520: The NOA correspondingly stores the second index information and the data segment.

Actually, it may only send one data segment each time, and sending may be performed multiple times, but each process is the same as S517 and S520, and is not described herein again.

S521: The UE1 sends a TCP acknowledgment message to the NOA.

S522: The NOA sends the TCP acknowledgment message to the NOC, and adds the second index information to the acknowledgment message.

The second index information may be added to an Option field of the TCP.

When correspondingly storing the second index information and the data segment, the NOA may query, by using a session identifier, for the second index information corresponding to the data segment. In one session process, a session identifier is unique.

A process of storing a data segment by the NOA may be understood as a process of injecting service data. Service data generally is injected step by step, and data with a quite small number of bytes may also be injected once for all.

S525: When the service data is injected in the NOA, a UE2 sends a service request to the NOA to request service data the same as that requested by the UE1, where the service request carries a service identifier.

S530: The NOA calculates second index information according to the service identifier, and determines, according to the second index information, that the service data has been stored in the NOA, that is, determines that it is hit.

S535: The NOA sends the service request to the SP server by using the NOC, where the service request carries hit indication information.

The hit indication information may be added to a TCP option field of the service request.

S540: The SP server sends a response packet to the NOC, where the response packet carries a data segment.

S541: The NOC charges the UE2 for the service data.

S545: The NOC replaces, in the response packet, the data segment with replacement information according to the replacement information.

Bandwidth occupied by the preconfigured replacement information is smaller than bandwidth occupied by the data segment.

In this embodiment of the present invention, the replacement information may only have 4 bytes or less bytes, and occupied backhaul bandwidth is far smaller than the bandwidth occupied by the data segment; therefore, the data volume of a Backhaul can be reduced, thereby saving bandwidth.

S550: The NOC sends the response packet to the NOA, where the response packet carries the replacement information.

S555: The NOA queries the data segment in local storage according to the replacement information.

It may be determined, according to the replacement information, that the data segment is stored in the local storage, and then the data segment of the service data is queried according to a session identifier of a current session.

S560: The NOA sends the data segment obtained by query to the UE2.

In this embodiment of the present invention, after a first data segment of service data requested by a UE1 is injected in an NOA, when a UE2 requests service data the same as the service data requested by the UE1, actually, the NOA gradually sends a data segment of the service data to the UE2 by obtaining the data segment from a stored data segment, and an NOC does not need to send the service data, which reduces the data volume of a Backhaul, thereby reducing the bandwidth occupancy.

Figure 10:
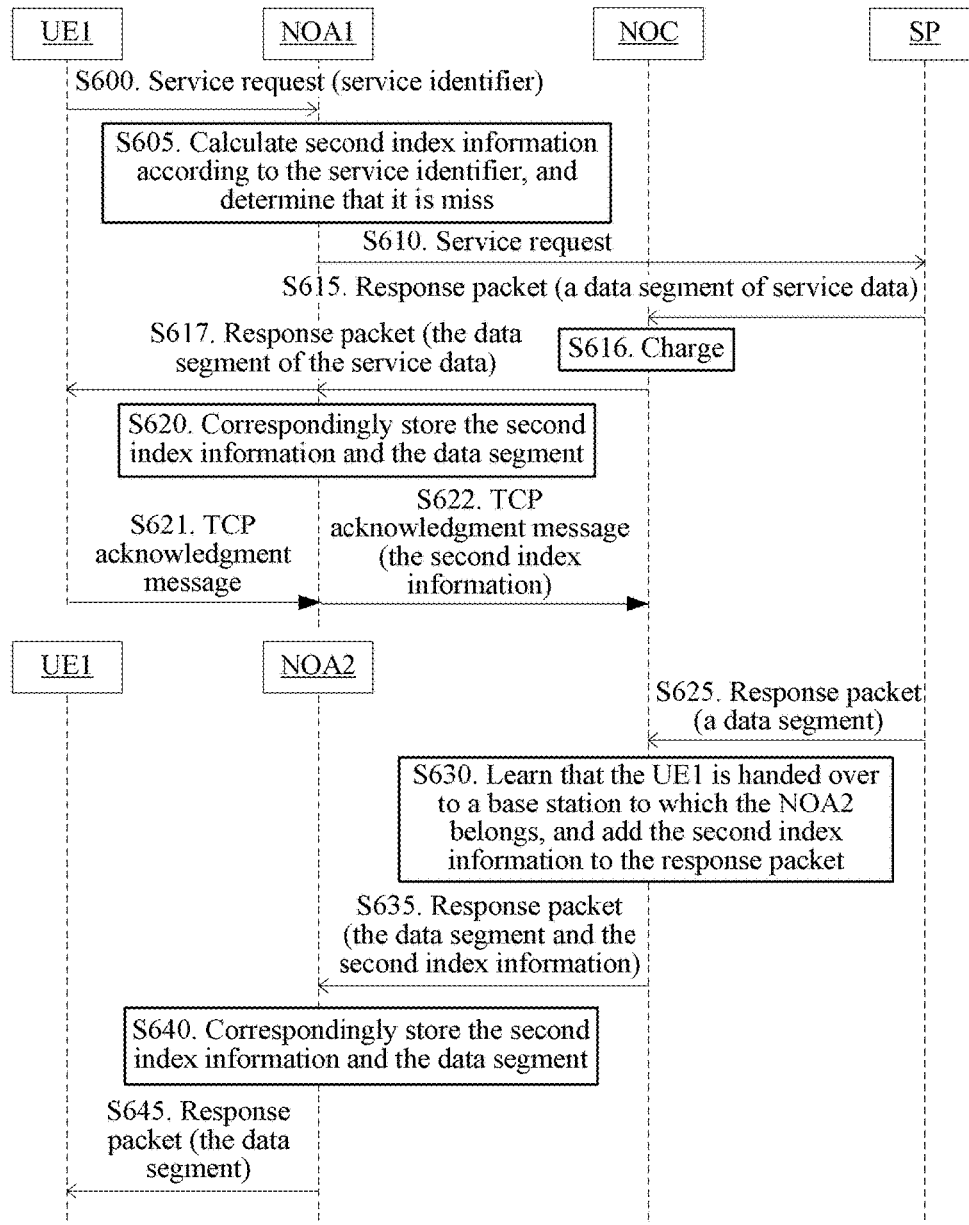
FIG. 10 is a schematic diagram of another embodiment of a service data management method in the embodiments of the present invention.

Referring to FIG. 10, another embodiment of the service data management method provided in the embodiments of the present invention includes:

Steps S600 to S622 are the same as the described content of S500 to S522, and are not described herein again.

A solution provided in this embodiment of the present invention is applied to a case in which when an NOA1 stores service data requested by a UE1, the UE1 is handed over to another eNodeB, where an NOA2 is deployed on the another eNodeB side.

S625: The SP server continues to send a data segment to the NOC by using a response packet.

S630: The NOC learns that the UE1 is handed over to another eNodeB, where an NOA2 is deployed on the another eNodeB side, and the NOC adds the second index information to the response packet.

S635: The NOC sends the second index information and a data segment that has not been stored to the NOA1 and is in the service data to the NOA2.

S640: The NOA2 correspondingly stores the second index information and the data segment that has not been stored to the NOA1 and is in the service data.

S645: The NOA2 sends the data segment to the UE1.

In this embodiment of the present invention, when a UE1 is handed over to another eNodeB in a process of injecting service data in an NOA1, where an NOA2 is deployed on the another eNodeB side, a remaining data segment that has not been injected in the NOA1 is injected in the NOA2.

Figure 11:
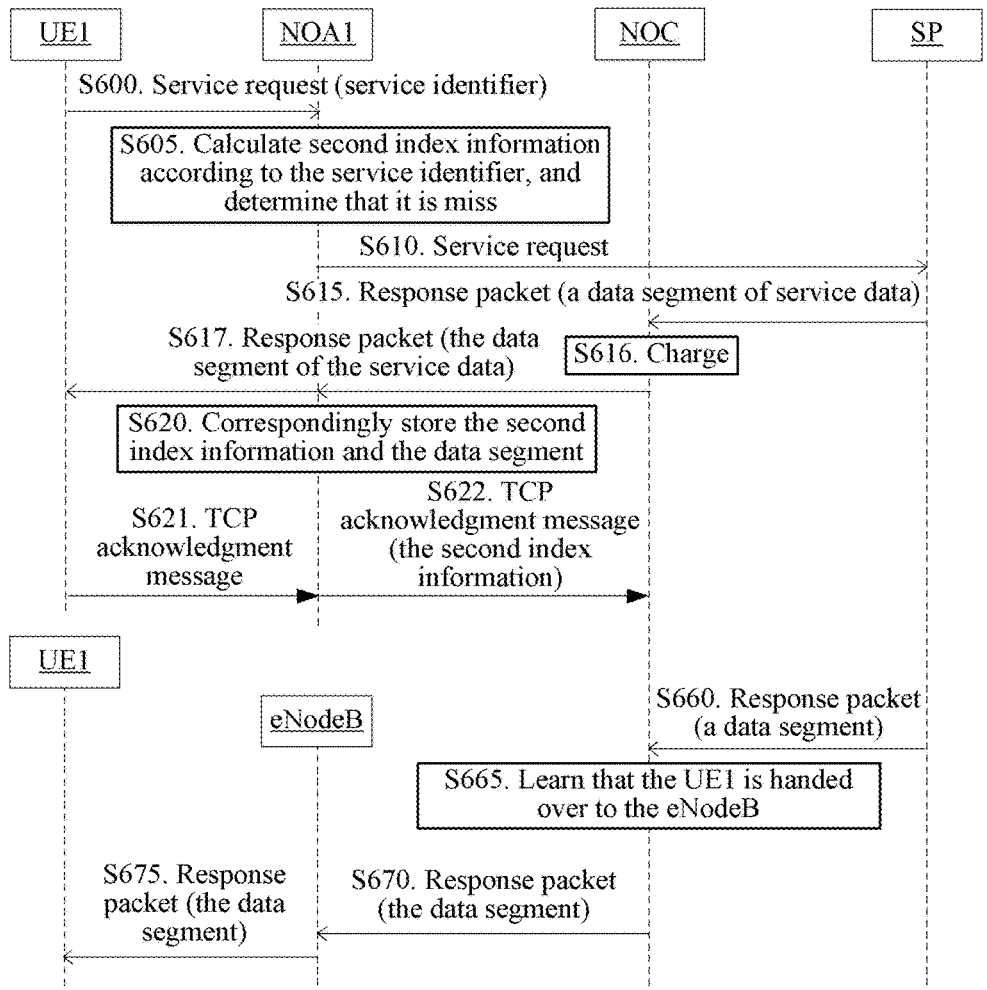
FIG. 11 is a schematic diagram of another embodiment of a service data management method in the embodiments of the present invention.

Referring to FIG. 11, another embodiment of the service data management method provided in the embodiments of the present invention includes:

Steps S600 to S622 are the same as the described content of S500 to S522, and are not described herein again.

A solution provided in this embodiment of the present invention is applied to a case in which when an NOA1 stores service data requested by a UE1, the UE1 is handed over to another eNodeB, where no other NOA is deployed on the another eNodeB side.

S660: The SP server continues to send a data segment to the NOC by using a response packet.

S665: The NOC learns that the UE1 is handed over to another eNodeB.

S670: The NOC sends the data segment to the another eNodeB by using the response packet.

S675: The another eNodeB forwards the data segment to the UE1.

In this embodiment of the present invention, when a UE1 is handed over to another eNodeB in a process of injecting service data in an NOA1, where no other NOA is deployed on the another eNodeB side, an NOC directly sends a response packet carrying a data segment to the another eNodeB, and the another eNodeB forwards the data segment to the UE1.

Figure 12:
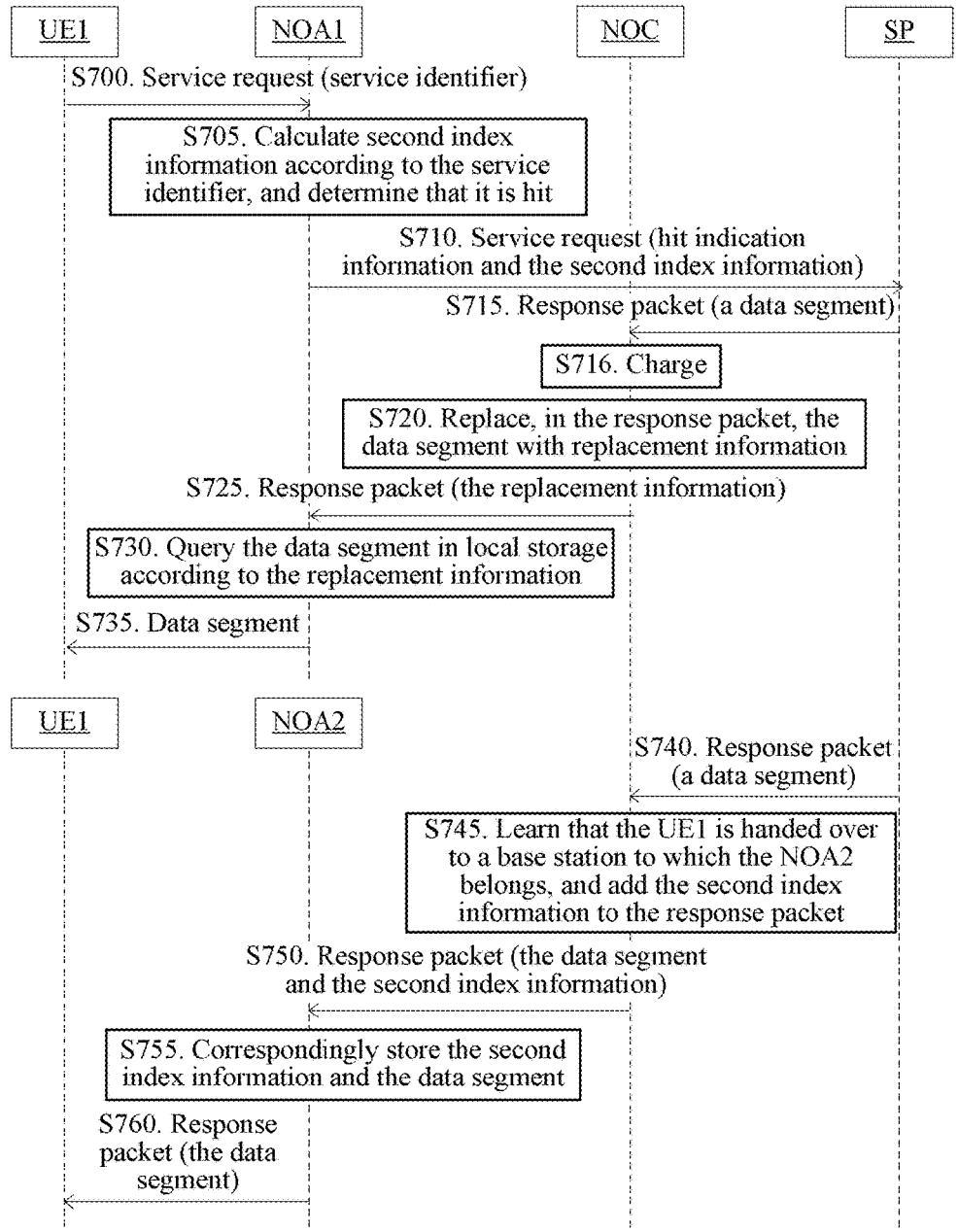
FIG. 12 is a schematic diagram of another embodiment of a service data management method in the embodiments of the present invention.

Referring to FIG. 12, another embodiment of the service data management method provided in the embodiments of the present invention includes:

Steps S700 to S735 are the same as the described content of S525 to S560, and are not described herein again.

A solution provided in this embodiment of the present invention is applied to a case in which service data requested by a UE1 has been stored in an NOA1, and when the NOA1 sends a data segment to the UE1, the UE1 is handed over to another eNodeB, where an NOA2 is deployed on the another eNodeB side, and the NOA2 does not have the service data stored.

S740: The SP server continues to send a data segment to the NOC by using a response packet.

S745: The NOC learns that the UE1 is handed over to another eNodeB, where an NOA2 is deployed on the another eNodeB side, and the NOC adds the second index information to the response packet.

S365: The NOC sends the second index information and a data segment that has not been sent by the NOA1 to the UE1 and is in the service data to the NOA2.

S370: Correspondingly store the second index information and the data segment that has not been sent by the NOA1 to the UE1.

S375: The NOA2 sends the data segment to the UE1.

In this embodiment of the present invention, when a UE1 is handed over to another eNodeB in a process of sending, by an NOA1 to the UE1, service data that has been stored, where an NOA2 is deployed on the another eNodeB side, a data segment that has not been sent by the NOA1 to the UE1 and is in the service data is injected in the NOA2.

Figure 13:
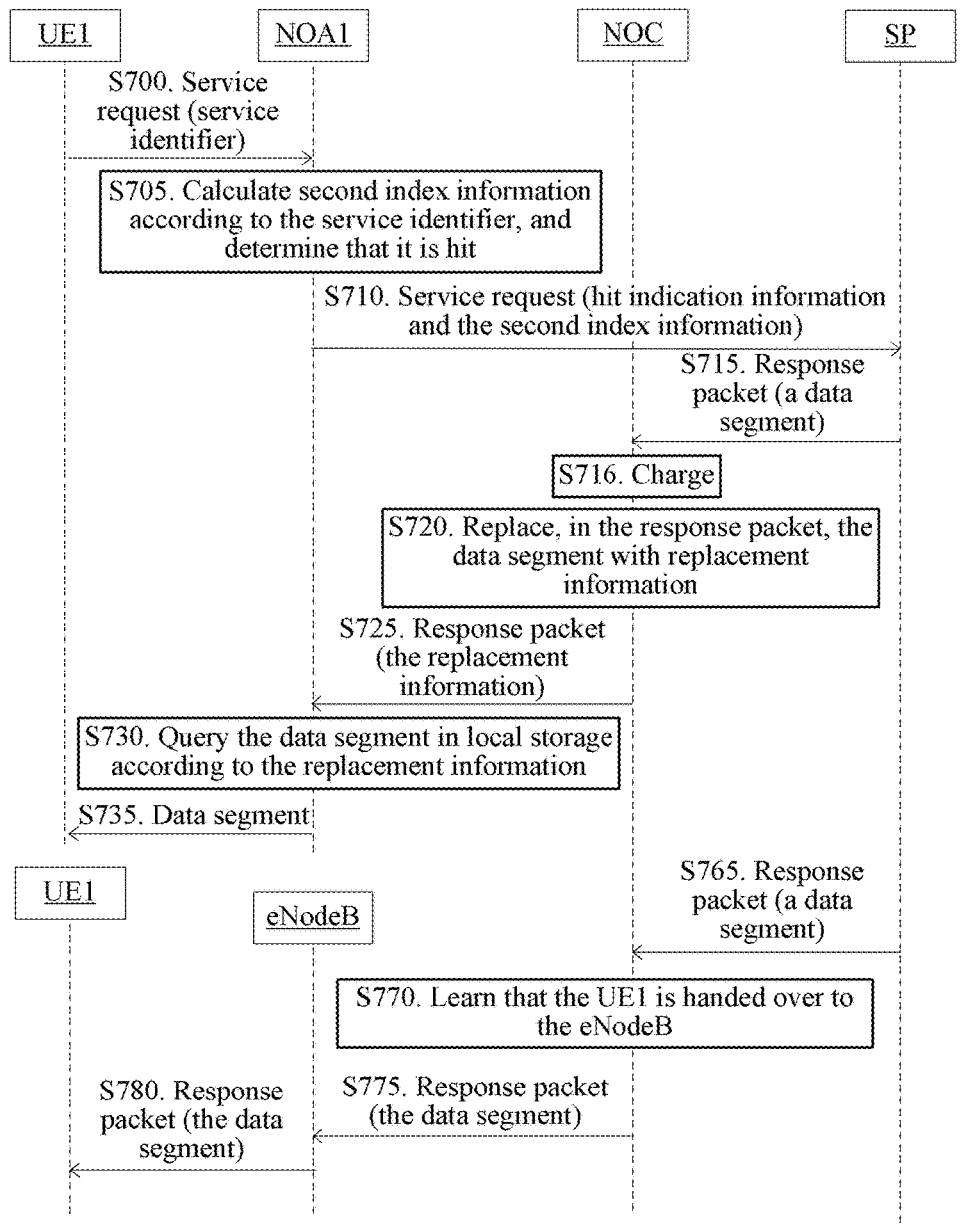
FIG. 13 is a schematic diagram of another embodiment of a service data management method in the embodiments of the present invention.

Referring to FIG. 13, another embodiment of the service data management method provided in the embodiments of the present invention includes:

Steps S700 to S735 are the same as the described content of S525 to S560, and are not described herein again.

A solution provided in this embodiment of the present invention is applied to a case in which service content requested by a UE1 has been stored in an NOA1, and when the NOA1 sends a data segment to the UE1, the UE1 is handed over to another eNodeB, where no NOA is deployed on the another eNodeB side.

S765: The SP server continues to send a data segment to the NOC by using a response packet.

S770: The NOC learns that the UE1 is handed over to another eNodeB.

S775: The NOC sends the data segment to the another eNodeB by using the response packet.

S780: The another eNodeB forwards the data segment to the UE1.

In this embodiment of the present invention, when a UE1 is handed over to another eNodeB in a process of sending, by an NOA1 to the UE1, service data that has been stored, where no other NOA is deployed on the another eNodeB side, an NOC directly sends a response packet carrying a data segment to the another eNodeB, and the another eNodeB forwards the data segment to the UE1.

Figure 14:
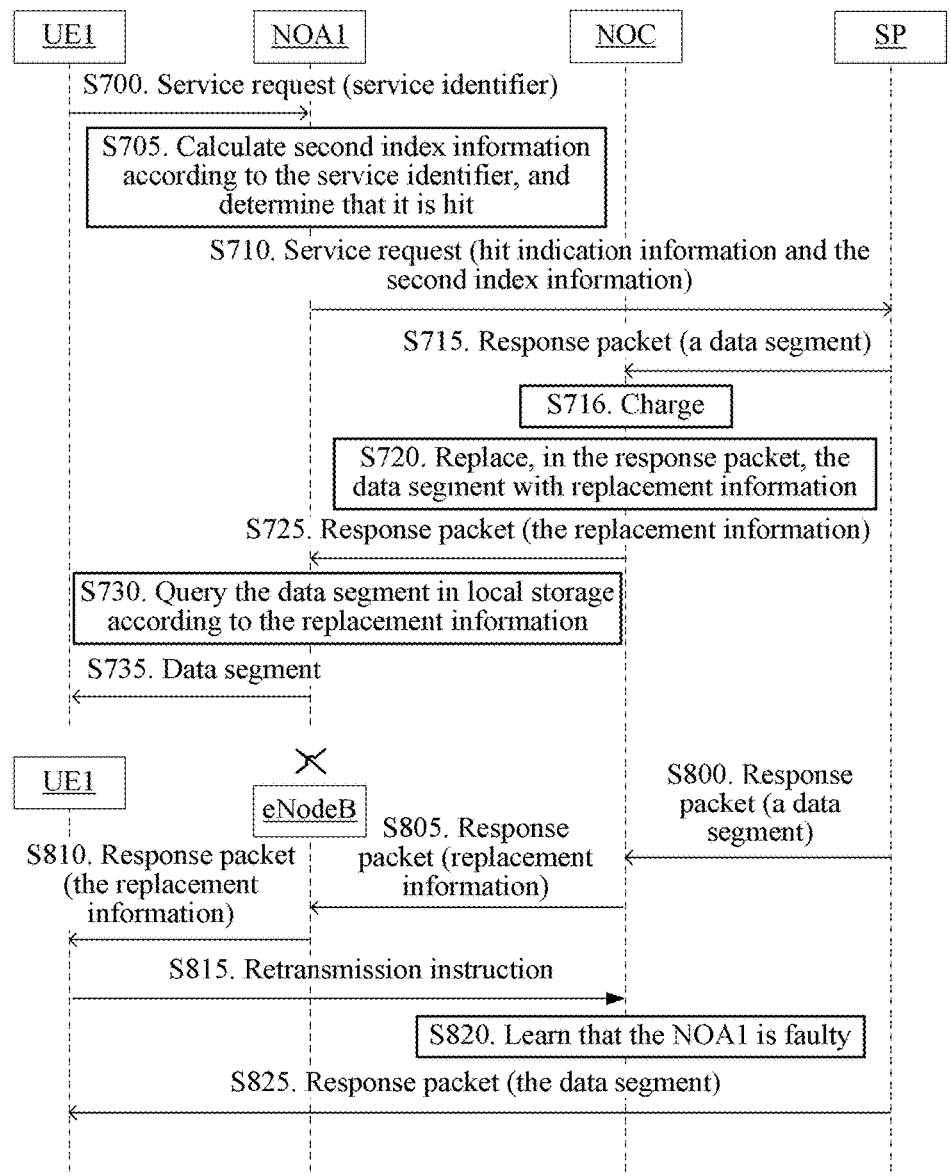
FIG. 14 is a schematic diagram of another embodiment of a service data management method in the embodiments of the present invention.

Referring to FIG. 14, another embodiment of the service data management method provided in the embodiments of the present invention includes:

Steps S700 to S735 are the same as the described content of S525 to S560, and are not described herein again.

A solution provided in this embodiment of the present invention is applied to a case in which an NOA1 is faulty in a process of sending, by the NOA1 to a UE1, service data that has been stored, and a process of S400 to S425 is executed:

S800: The SP server continues to send a data segment to the NOC by using a response packet.

S805: The NOC sends the response packet to an eNodeB, where the response packet carries replacement information.

S810: The eNodeB sends the response packet to the UE1, where the response packet carries the replacement information.

S815: The UE1 learns a data transmission error, and sends a retransmission instruction to the NOC by using the eNodeB.

S820: The NOC learns that the NOA1 is faulty, and in a subsequent response packet, does not replace a data segment with replacement information.

S825: The SP server sends a data segment to the UE1 by using the NOC and the eNodeB.

In all of the foregoing embodiments provided by FIG. 9 to FIG. 14, the NOA calculates, in the process of sending the service request by the UE, the second index information according to the service identifier carried in the service request.

SPs in FIG. 3 to FIG. 14 all are SP servers, and the word server is not shown in the figures.

Figure 15:
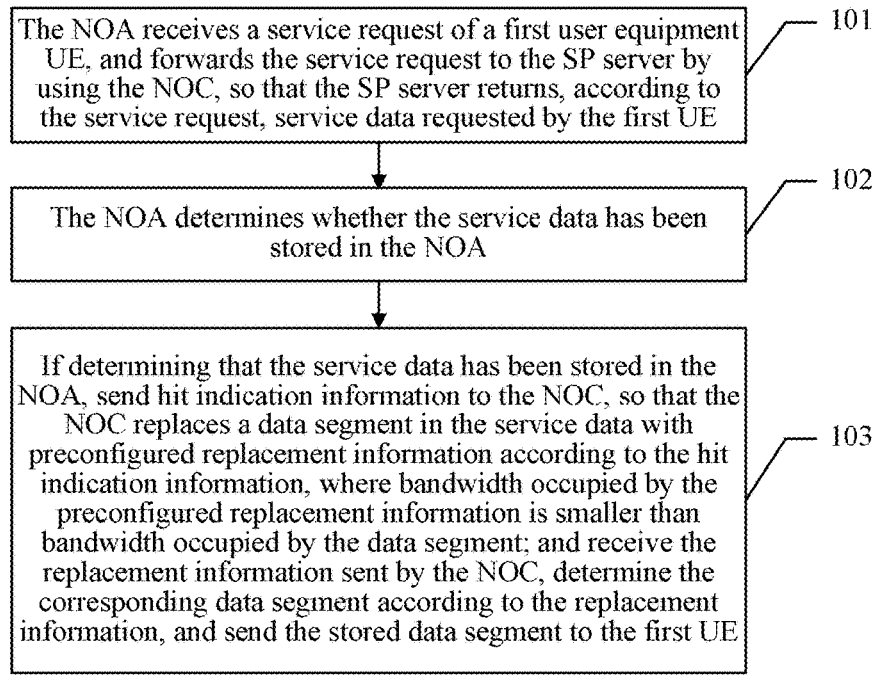
FIG. 15 is a schematic diagram of another embodiment of a service data management method in the embodiments of the present invention.

Referring to FIG. 15, another embodiment of the service data management method provided in the embodiments of the present invention includes:

The method is applied to a wireless communications system, the wireless communications system includes: a base station, a gateway, a network optimization agent NOA, a network optimization controller NOC, and an SP server, the NOA is deployed on the base station side, the NOC is deployed on the gateway side, and the method includes:

101: The NOA receives a service request of a first user equipment UE, and forwards the service request to the SP server by using the NOC, so that the SP server returns, according to the service request, service data requested by the first UE.

102: The NOA determines whether the service data has been stored in the NOA.

103: If determining that the service data has been stored in the NOA, send hit indication information to the NOC, so that the NOC replaces a data segment in the service data with preconfigured replacement information according to the hit indication information, where bandwidth occupied by the preconfigured replacement information is smaller than bandwidth occupied by the data segment; and receive the replacement information sent by the NOC, determine the corresponding data segment according to the replacement information, and send the data segment, which has been stored, to the first UE.

In the service data management method provided in this embodiment of the present invention, the method is applied to a wireless communications system, the wireless communications system includes: a base station, a gateway, a network optimization agent NOA, a network optimization controller NOC, and an SP server, the NOA is deployed on the base station side, the NOC is deployed on the gateway side, and the method includes: receiving, by the NOA, a service request of a first user equipment UE, and forwarding the service request to the SP server by using the NOC, so that the SP server returns, according to the service request, service data requested by the first UE; determining, by the NOA, whether the service data has been stored in the NOA; and if determining that the service data has been stored in the NOA, sending hit indication information to the NOC, so that the NOC replaces a data segment in the service data with preconfigured replacement information according to the hit indication information, where bandwidth occupied by the preconfigured replacement information is smaller than bandwidth occupied by the data segment; and receiving the replacement information sent by the NOC, determining the corresponding data segment according to the replacement information, and sending the data segment, which has been stored, to the first UE.

Compared with the prior art, in the service data management method provided in this embodiment of the present invention, when service data is requested for a first time, the network optimization agent NOA stores the service data, when the service data is requested for a second time, compared with the prior art, in the service data management method provided in this embodiment of the present invention, a network optimization agent NOA is deployed on a base station side, and a network optimization controller NOC is deployed on a gateway side, to manage service data; in this way, when service data is requested for a first time, the network optimization agent NOA stores the service data, so that when the service data is requested for a second time, the network optimization controller NOC does not need to send the service data one more time, and instead, after the NOC completes charging, the NOA sends the service data to a UE, which reduces the data volume of a Backhaul, thereby reducing the Backhaul bandwidth occupancy.

Optionally, based on the embodiment corresponding to FIG. 15, in a first optional embodiment of the service data management method provided in the embodiments of the present invention, the method may further include:

if determining that the service data is not stored in the NOA, sending miss indication information to the NOC, so that the NOC sends a data segment included in the service data to the NOA according to the miss indication information, receiving the data segment from the NOC, and storing the received data segment to the NOA; and when a second UE requests the service data, sending, by the NOA to the second UE, the data segment that has been stored.

Optionally, based on the first optional embodiment, in a second optional embodiment of the service data management method provided in the embodiments of the present invention, that the SP server returns service data requested by the first UE may include:

adding, by the SP server, the data segment included in the service data to one or more response packets, and sending the one or more response packets to the NOC; and the determining whether the service data has been stored in the NOA may include:

receiving a first response packet sent by the NOC, where the first response packet carries a first data segment segment in the service data requested by the first UE;

generating first index information according to the first data segment;

querying whether the first index information has been stored in the NOA; and if the first index information has been stored in the NOA, determining that the service data has been stored in the NOA;

if the first index information is not stored in the NOA, determining that the service data is not stored in the NOA.

Optionally, based on the first optional embodiment, in a third optional embodiment of the service data management method provided in the embodiments of the present invention, the determining whether the service data has been stored in the NOA may include:

parsing the service request to obtain a service identifier;
generating second index information according to the service identifier;

querying whether the second index information has been stored in the NOA; and if the second index information has been stored in the NOA, determining that the service data has been stored in the NOA;

if the second index information is not stored in the NOA, determining that the service data is not stored in the NOA.

The service data management method provided in the foregoing multiple embodiments of the present invention may be understood with reference to the processes executed by the NOA in FIG. 1 to FIG. 14, and is not described herein again.

Figure 16:
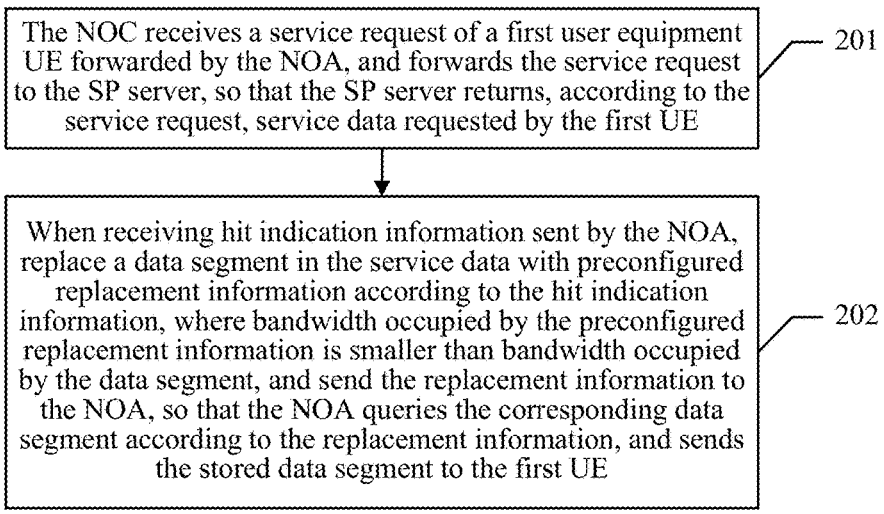
FIG. 16 is a schematic diagram of another embodiment of a service data management method in the embodiments of the present invention.

Referring to FIG. 16, another embodiment of the service data management method provided in the embodiments of the present invention includes:

The method is applied to a wireless communications system, the wireless communications system includes: a base station, a gateway, a network optimization agent NOA, a network optimization controller NOC, and a service provider SP server, the NOA is deployed on the base station side, the NOC is deployed on the gateway side, and the method includes:

201: The NOC receives a service request that is of a first user equipment UE and is forwarded by the NOA, and forwards the service request to the SP server, so that the SP server returns, according to the service request, service data requested by the first UE.

202: When receiving hit indication information sent by the NOA, replace a data segment in the service data with preconfigured replacement information according to the hit indication information, where bandwidth occupied by the preconfigured replacement information is smaller than bandwidth occupied by the data segment, and send the replacement information to the NOA, so that the NOA queries the corresponding data segment according to the replacement information, and sends the data segment, which has been stored, to the first UE.

In the service data management method provided in this embodiment of the present invention, the method is applied to a wireless communications system, the wireless communications system includes: a base station, a gateway, a network optimization agent NOA, a network optimization controller NOC, and a service provider SP server, the NOA is deployed on the base station side, the NOC is deployed on the gateway side, and the method includes: receiving, by the NOC, a service request that is of a first user equipment UE and is forwarded by the NOA, and forwarding the service request to the SP server, so that the SP server returns, according to the service request, service data requested by the first UE; and when receiving hit indication information sent by the NOA, replacing a data segment in the service data with preconfigured replacement information according to the hit indication information, where bandwidth occupied by the preconfigured replacement information is smaller than bandwidth occupied by the data segment, and sending the replacement information to the NOA, so that the NOA queries the corresponding data segment according to the replacement information, and sends the data segment, which has been stored, to the first UE.

Compared with the prior art, in the service data management method provided in this embodiment of the present invention, a network optimization agent NOA is deployed on a base station side, and a network optimization controller NOC is deployed on a gateway side, to manage service data; in this way, when service data is requested for a first time, the network optimization agent NOA stores the service data, so that when the service data is requested for a second time, the network optimization controller NOC does not need to send the service data one more time, and instead, after the NOC completes charging, the NOA sends the service data to a UE, which reduces the data volume of a Backhaul, thereby reducing the Backhaul bandwidth occupancy.

Optionally, based on the embodiment corresponding to FIG. 16, in a first optional embodiment of the service data management method provided in the embodiments of the present invention, the method may further include:

when receiving miss indication information, sending a data segment included in the service data to the NOA according to the miss indication information, so that the NOA stores the received data segment to the NOA, and when a second UE requests the service data, the NOA sends the data segment, which has been stored, to the second UE.

Optionally, based on the first optional embodiment corresponding to FIG. 16, in a second optional embodiment of the service data management method provided in the embodiments of the present invention, that the SP server returns service data requested by the first UE may include:

adding, by the SP server, the data segment included in the service data to one or more response packets, and sending the one or more response packets to the NOC; and receiving the one or more response packets sent by the SP server, and sending the one or more response packets to the NOA, where a first response packet in the one or more response packets carries a first data segment in the service data requested by the first UE, so that the NOA generates first index information according to the first data segment.

Optionally, based on the second optional embodiment corresponding to FIG. 16, in a third optional embodiment of the service data management method provided in the embodiments of the present invention, the method may further include:

receiving the first index information and second index information that are sent by the NOA, where the second index information is generated by the NOA according to a service identifier obtained by parsing the service request.

Optionally, based on the third optional embodiment corresponding to FIG. 16, in a fourth optional embodiment of the service data management method provided in the embodiments of the present invention, the method may further include:

if it is identified, when the data segment is sent to the NOA, that the first UE is handed over to another base station, and another NOA is deployed on the another base station side, sending the first index information or the second index information, and a remaining data segment that has not been sent to the NOA and is in the service data to the another NOA, so that the another NOA correspondingly stores the first index information or the second index information, and the remaining data segment.

Optionally, based on the first or second or third optional embodiment corresponding to FIG. 16, in a fifth optional embodiment of the service data management method provided in the embodiments of the present invention, the method may further include:

if it is identified, when the data segment is sent to the NOA, that the first UE is handed over to another base station, and no other NOA is deployed on the another base station side, sending a remaining data segment that has not been sent to the NOA and is in the service data to the another base station.

Optionally, based on the third optional embodiment corresponding to FIG. 16, in a sixth optional embodiment of the service data management method provided in the embodiments of the present invention, the method may further include:

if it is identified, when the replacement information is sent to the NOA, that the first UE is handed over to another base station, and another NOA is deployed on the another base station side, sending the first index information or the second index information, and a remaining data segment that has not been sent by the NOA to the first UE and is in the service data to the another NOA, so that the another NOA correspondingly stores the first index information or the second index information, and the remaining data segment.

Optionally, based on the embodiment corresponding to FIG. 16, or the first, second or third optional embodiment, in a seventh optional embodiment of the service data management method provided in the embodiments of the present invention, if it is identified, when the replacement information is sent to the NOA, that the first UE is handed over to another base station, and no other NOA is deployed on the another base station side, a remaining data segment that has not been sent by the NOA to the first UE and is in the service data is sent to the another base station.

Optionally, based on the embodiment corresponding to FIG. 16 or any one of the first to seventh optional embodiments, in an eighth optional embodiment of the service data management method provided in the embodiments of the present invention, the method may further include:

if a data retransmission instruction sent by the first UE is received, and it is confirmed that the NOA is faulty, sending a remaining data segment that has not been sent by the NOA to the first UE and is in the service data to a base station in which the first UE is located.

The service data management method provided in the foregoing multiple embodiments of the present invention may be understood with reference to the processes executed by the NOC in FIG. 1 to FIG. 14, and is not described herein again.

Figure 17:
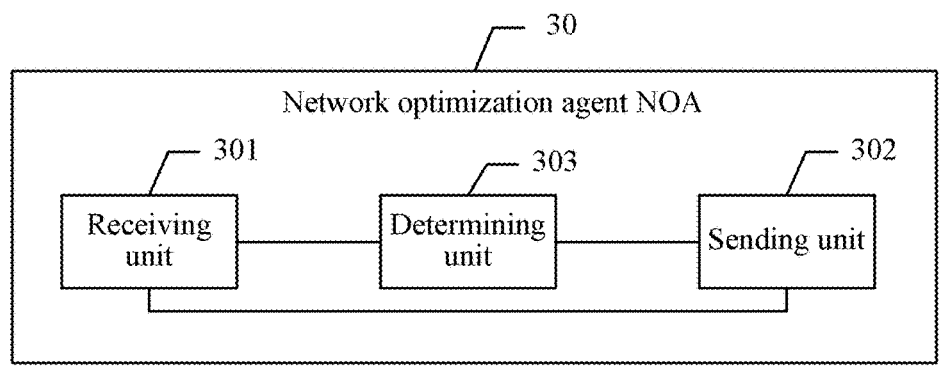
FIG. 17 is a schematic diagram of an embodiment of a network optimization agent NOA in the embodiments of the present invention.

Referring to FIG. 17, an embodiment of a network optimization agent NOA 30 provided in the embodiments of the present invention includes: The NOA is applied to a wireless communications system, the wireless communications system further includes: a base station, a gateway, a network optimization controller NOC, and a service provider (SP) server, the NOA is deployed on the base station side, the NOC is deployed on the gateway side, and the NOA includes:

a receiving unit 301, configured to receive a service request of a first user equipment UE;

a sending unit 302, configured to forward the service request received by the receiving unit 301 to the SP server by using the NOC, so that the SP server returns, according to the service request, service data requested by the first UE; and a determining unit 303, configured to determine whether the service data has been stored in the NOA, where the sending unit 302 is further configured to: when the determining unit 302 determines that the service data has been stored in the NOA, send hit indication information to the NOC, so that the NOC replaces a data segment in the service data with preconfigured replacement information according to the hit indication information, where bandwidth occupied by the preconfigured replacement information is smaller than bandwidth occupied by the data segment;

the receiving unit 301 is further configured to receive the replacement information sent by the NOC;

the determining unit 303 is further configured to determine the corresponding data segment according to the replacement information received by the receiving unit 301; and the sending unit 302 is further configured to send the data segment that has been stored and is determined by the determining unit 303 to the first UE.

In this embodiment of the present invention, the NOA is applied to a wireless communications system, the wireless communications system further includes: a base station, a gateway, a network optimization controller NOC, and a service provider (SP) server, the NOA is deployed on the base station side, the NOC is deployed on the gateway side, and the NOA includes: a receiving unit 301, receiving a service request of a first user equipment UE; a sending unit 302, forwarding the service request received by the receiving unit 301 to the SP server by using the NOC, so that the SP server returns, according to the service request, service data requested by the first UE; and a determining unit 303, determining whether the service data has been stored in the NOA, where when the determining unit 302 determines that the service data has been stored in the NOA, the sending unit 302 further sends hit indication information to the NOC, so that the NOC replaces a data segment in the service data with preconfigured replacement information according to the hit indication information, where bandwidth occupied by the preconfigured replacement information is smaller than bandwidth occupied by the data segment; the receiving unit 301 further receives the replacement information sent by the NOC; the determining unit 303 further determines the corresponding data segment according to the replacement information received by the receiving unit 301; and the sending unit 302 further sends the data segment that has been stored and is determined by the determining unit 303 to the first UE. Compared with the prior art, with regard to the NOA provided in this embodiment of the present invention, the network optimization agent NOA is deployed on a base station side, and a network optimization controller NOC is deployed on a gateway side, to manage service data; in this way, when service data is requested for a first time, the network optimization agent NOA stores the service data, so that when the service data is requested for a second time, the network optimization controller NOC does not need to send the service data one more time, and instead, after the NOC completes charging, the NOA sends the service data to a UE, which reduces the data volume of a Backhaul, thereby reducing the Backhaul bandwidth occupancy.

Figure 18:
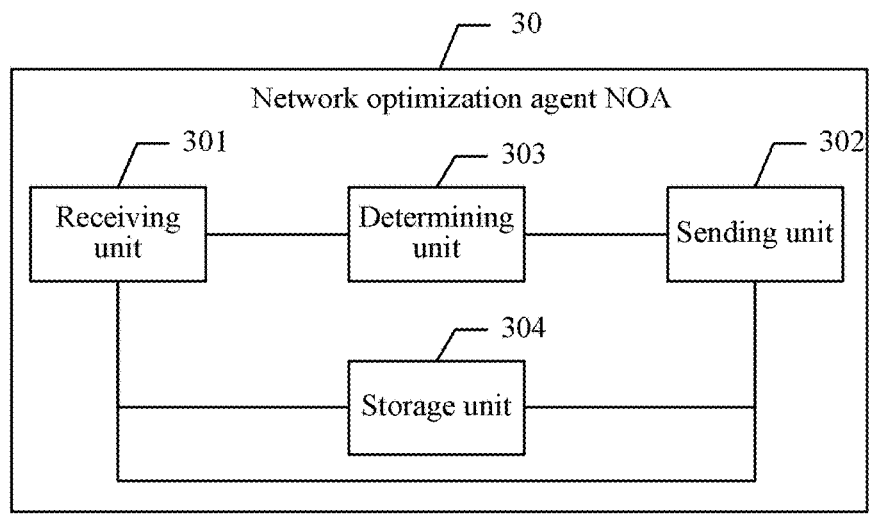
FIG. 18 is a schematic diagram of another embodiment of a network optimization agent NOA in the embodiments of the present invention.

Optionally, based on the embodiment corresponding to FIG. 17, referring to FIG. 18, in another embodiment of the NOA provided in the embodiments of the present invention, the NOA further includes a storage unit 304, where the sending unit 302 is further configured to: when the determining unit 303 determines that the service data is not stored in the NOA, send miss indication information to the NOC, so that the NOC sends a data segment included in the service data to the NOA according to the miss indication information;

the receiving unit 301 is further configured to receive the data segment from the NOC;

the storage unit 304 is configured to store the data segment received by the receiving unit 301; and the sending unit 302 is further configured to: when a second UE requests the service data, send the data segment that has been stored by the storage unit 304 to the second UE.

Figure 19:
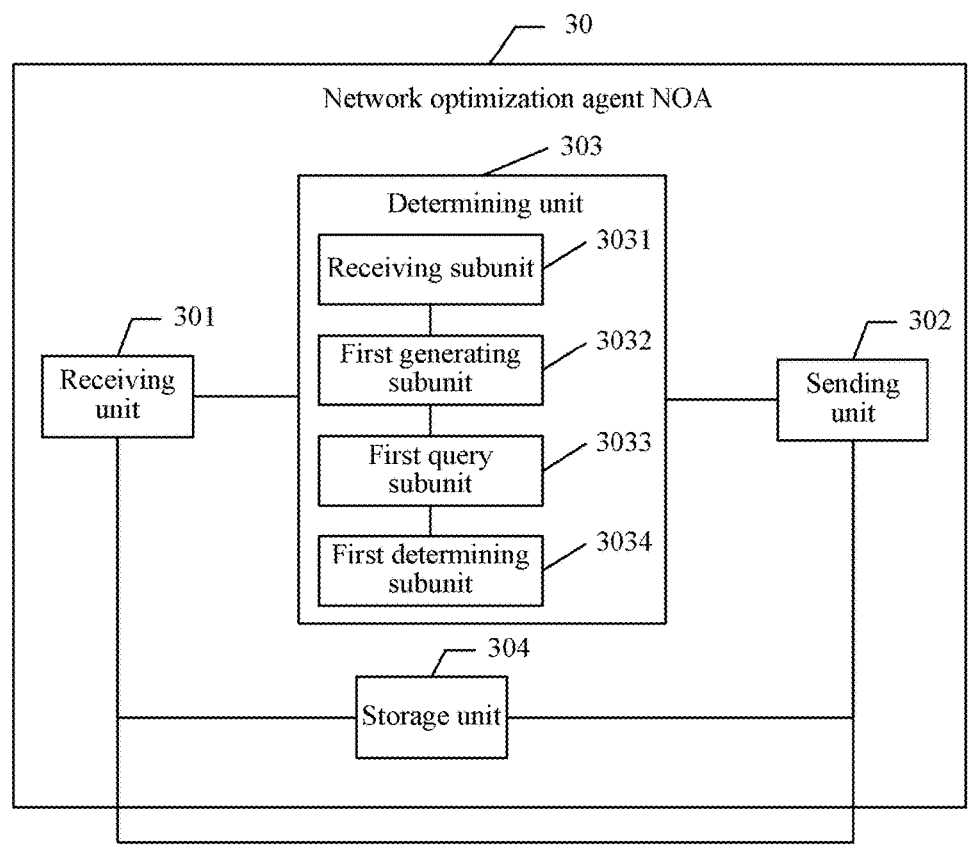
FIG. 19 is a schematic diagram of another embodiment of a network optimization agent NOA in the embodiments of the present invention.

Optionally, based on the embodiment corresponding to FIG. 18, referring to FIG. 19, in another embodiment of the NOA provided in the embodiments of the present invention, the SP server adds the data segment included in the service data to one or more response packets, and sends the one or more response packets to the NOC; and the determining unit 303 includes:

a receiving subunit 3031, configured to receive a first response packet sent by the NOC, where the first response packet carries a first data segment in the service data requested by the first UE;

a first generating subunit 3032, configured to generate first index information according to the first data segment received by the receiving subunit 3031;

a first query subunit 3033, configured to query whether the first index information generated by the first generating subunit 3032 has been stored in the NOA; and a first determining subunit 3034, configured to: when the first query subunit 3033 queries that the first index information has been stored in the NOA, determine that the service data has been stored in the NOA; when the first query subunit queries that the first index information is not stored in the NOA, determine that the service data is not stored in the NOA.

Figure 20:
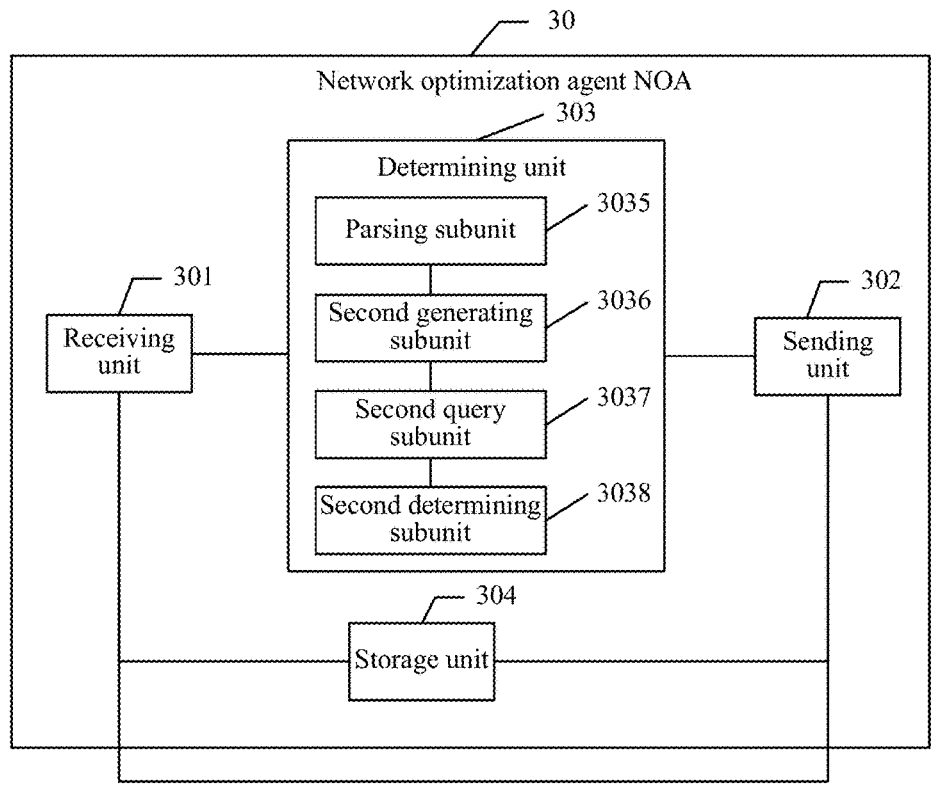
FIG. 20 is a schematic diagram of another embodiment of a network optimization agent NOA in the embodiments of the present invention.

Optionally, based on the embodiment corresponding to FIG. 18, referring to FIG. 20, in another embodiment of the NOA provided in the embodiments of the present invention, the SP server adds the data segment included in the service data to one or more response packets, and sends the one or more response packets to the NOC; and the determining unit 303 includes:

a parsing subunit 3035, configured to parse the service request to obtain a service identifier;

a second generating subunit 3036, configured to generate second index information according to the service identifier obtained by the parsing subunit 3035 by parsing;

a second query subunit 3037, configured to query whether the second index information generated by the second generating subunit 3036 has been stored in the NOA; and a second determining subunit 3038, configured to: when the second query subunit 3037 queries that the second index information has been stored in the NOA, determine that the service data has been stored in the NOA; when the second query subunit queries that the second index information is not stored in the NOA, determine that the service data is not stored in the NOA.

Figure 21:
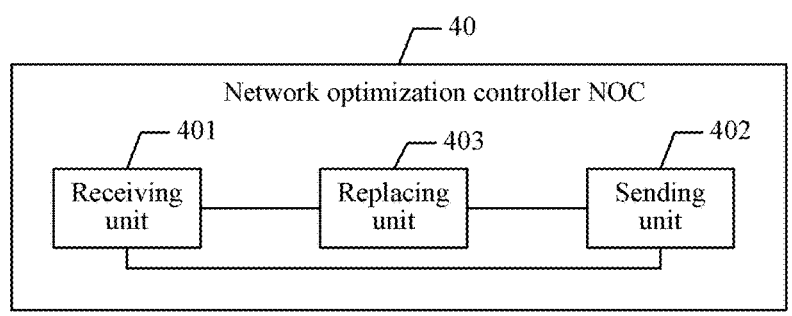
FIG. 21 is a schematic diagram of an embodiment of a network optimization controller NOC in the embodiments of the present invention.

Referring to FIG. 21, an embodiment of a network optimization controller NOC 40 provided in the embodiments of the present invention includes: The NOC is applied to a wireless communications system, the wireless communications system further includes: a base station, a gateway, a network optimization agent NOA, and a service provider (SP) server, the NOA is deployed on the base station side, the NOC is deployed on the gateway side, and the NOC includes:

a receiving unit 401, configured to receive a service request that is of a first user equipment UE and is forwarded by the NOA;

a sending unit 402, configured to forward the service request received by the receiving unit 401 to the SP server, so that the SP server returns, according to the service request, service data requested by the first UE, where the receiving unit 401 is further configured to receive hit indication information sent by the NOA; and a replacing unit 403, configured to: when the receiving unit 403 receives the hit indication information sent by the NOA, replace a data segment in the service data with preconfigured replacement information according to the hit indication information, where bandwidth occupied by the preconfigured replacement information is smaller than bandwidth occupied by the data segment, where the sending unit 402 is further configured to send the replacement information replaced by the replacing unit 403 to the NOA, so that the NOA queries the corresponding data segment according to the replacement information, and sends the data segment, which has been stored, to the first UE.

In this embodiment of the present invention, the NOC is applied to a wireless communications system, the wireless communications system further includes: a base station, a gateway, a network optimization agent NOA, and a service provider (SP) server, the NOA is deployed on the base station side, the NOC is deployed on the gateway side, and the NOC includes: a receiving unit 401, receiving a service request that is of a first user equipment UE and is forwarded by the NOA; a sending unit 402, forwarding the service request received by the receiving unit 401 to the SP server, so that the SP server returns, according to the service request, service data requested by the first UE, where the receiving unit 401 further receives hit indication information sent by the NOA; and a replacing unit 403, replacing, when the receiving unit 403 receives the hit indication information sent by the NOA, a data segment in the service data with preconfigured replacement information according to the hit indication information, where bandwidth occupied by the preconfigured replacement information is smaller than bandwidth occupied by the data segment, where the sending unit 402 further sends the replacement information replaced by the replacing unit 403 to the NOA, so that the NOA queries the corresponding data segment according to the replacement information, and sends the data segment, which has been stored, to the first UE.

Compared with the prior art, with regard to the NOC provided in this embodiment of the present invention, a network optimization agent NOA is deployed on a base station side, and the network optimization controller NOC is deployed on a gateway side, to manage service data; in this way, when service data is requested for a first time, the network optimization agent NOA stores the service data, so that when the service data is requested for a second time, the network optimization controller NOC does not need to send the service data one more time, and instead, after the NOC completes charging, the NOA sends the service data to a UE, which reduces the data volume of a Backhaul, thereby reducing the Backhaul bandwidth occupancy.

Optionally, based on the embodiment corresponding to FIG. 21, in a first optional embodiment of the NOC provided in the embodiments of the present invention, the receiving unit 401 is further configured to receive miss indication information; and the sending unit 404 is further configured to: when the receiving unit 401 receives the miss indication information, send a data segment included in the service data to the NOA according to the miss indication information, so that the NOA stores the received data segment to the NOA, and when a second UE requests the service data, the NOA sends the data segment, which has been stored, to the second UE.

Optionally, based on the optional embodiment corresponding to FIG. 21, in a second optional embodiment of the NOC provided in the embodiments of the present invention, the SP server adds the data segment included in the service data to one or more response packets, and sends the one or more response packets to the NOC;

the receiving unit 401 is further configured to receive the one or more response packets sent by the SP server; and the sending unit 402 is further configured to send the one or more response packets to the NOA, where a first response packet in the one or more response packets carries a first data segment in the service data requested by the first UE, so that the NOA generates first index information according to the first data segment.

Optionally, based on the optional embodiment corresponding to FIG. 21, in a third optional embodiment of the NOC provided in the embodiments of the present invention, the receiving unit 401 is further configured to receive the first index information and second index information that are sent by the NOA, where the second index information is generated by the NOA according to a service identifier obtained by parsing the service request.

Figure 22:
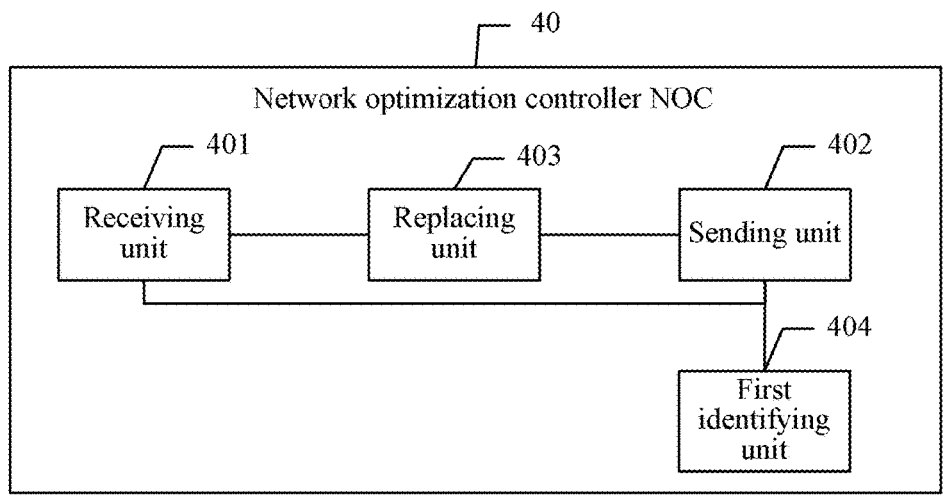
FIG. 22 is a schematic diagram of another embodiment of a network optimization controller NOC in the embodiments of the present invention.

Optionally, based on the third optional embodiment corresponding to FIG. 21, referring to FIG. 22, in another embodiment of the NOC provided in the embodiments of the present invention, the NOC further includes a first identifying unit 404, where the first identifying unit 404 is configured to: when the sending unit 402 sends the data segment to the NOA, identify that the first UE is handed over to another base station, and another NOA is deployed on the another base station side; and the sending unit 402 is configured to send the first index information or the second index information, and a remaining data segment that has not been sent to the NOA and is in the service data to the another NOA that is identified by the first identifying unit 404 after the first UE is handed over, so that the another NOA correspondingly stores the first index information or the second index information, and the remaining data segment.

Figure 23:
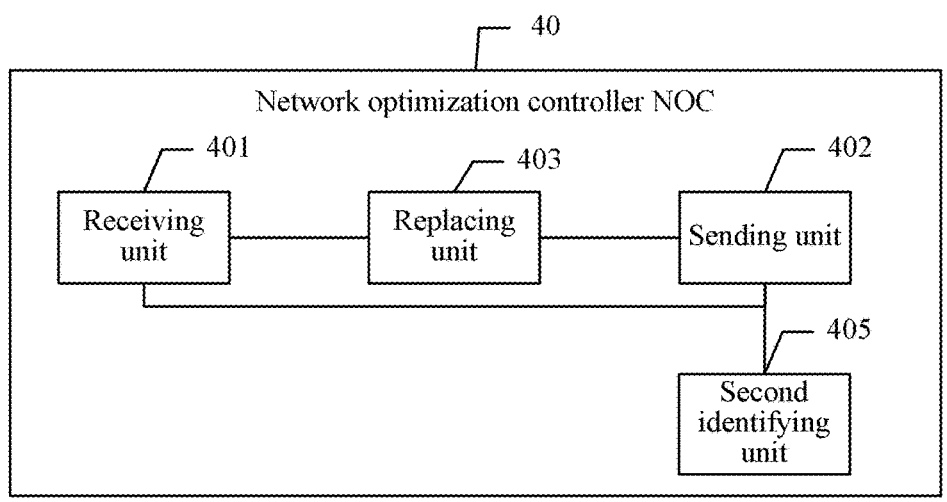
FIG. 23 is a schematic diagram of another embodiment of a network optimization controller NOC in the embodiments of the present invention.

Optionally, based on the third optional embodiment corresponding to FIG. 21, referring to FIG. 23, in another embodiment of the NOC provided in the embodiments of the present invention, the NOC further includes a second identifying unit 405, where the second identifying unit 405 is configured to: when the sending unit 402 sends the data segment to the NOA, identify that the first UE is handed over to another base station, and no other NOA is deployed on the another base station side; and the sending unit 402 is further configured to send a remaining data segment that has not been sent to the NOA and is in the service data to the another base station that is identified by the second identifying unit 405 and to which the first UE is handed over.

Figure 24:
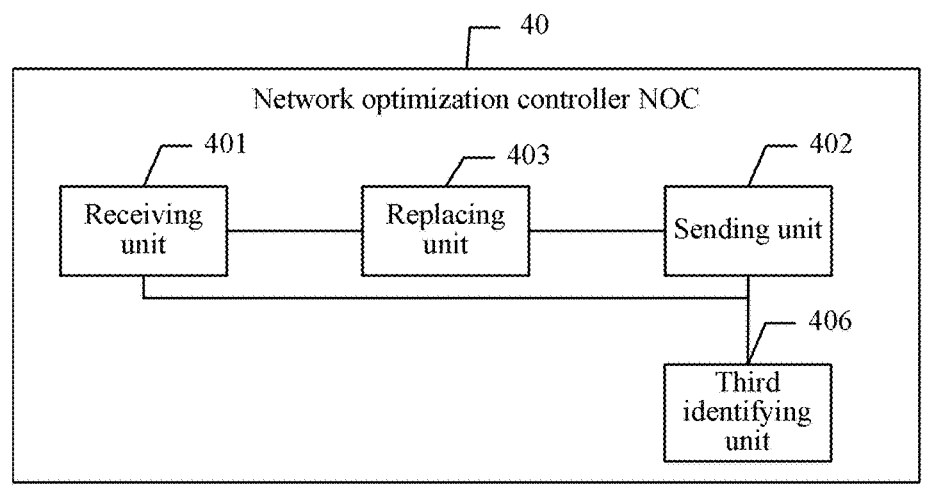
FIG. 24 is a schematic diagram of another embodiment of a network optimization controller NOC in the embodiments of the present invention.

Optionally, based on the third optional embodiment corresponding to FIG. 21, referring to FIG. 24, in another embodiment of the NOC provided in the embodiments of the present invention, the NOC further includes a third identifying unit 406, where the third identifying unit 406 is configured to: when the replacement information is sent to the NOA, identify that the first UE is handed over to another base station, and another NOA is deployed on the another base station side; and the sending unit 402 is configured to send the first index information or the second index information, and a remaining data segment that has not been sent by the NOA to the first UE and is in the service data to the another NOA that is identified by the third identifying unit 406 and to which the first UE is handed over, so that the another NOA correspondingly stores the first index information or the second index information, and the remaining data segment.

Figure 25:
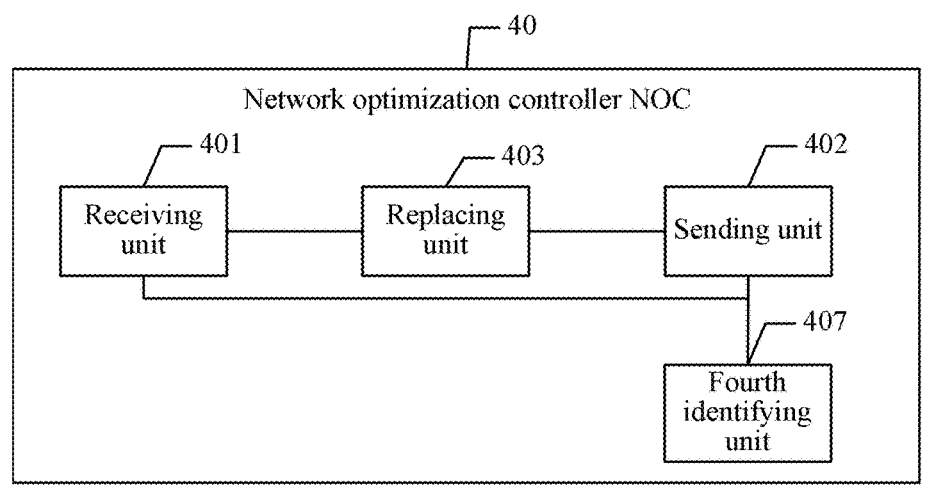
FIG. 25 is a schematic diagram of another embodiment of a network optimization controller NOC in the embodiments of the present invention.

Optionally, based on the third optional embodiment corresponding to FIG. 21, referring to FIG. 25, in another embodiment of the NOC provided in the embodiments of the present invention, the NOC further includes a fourth identifying unit 407, where the fourth identifying unit 407 is configured to: when the replacement information is sent to the NOA, identify that the UE is handed over to another base station, and no other NOA is deployed on the another base station side; and the sending unit 402 is further configured to send a remaining data segment that has not been sent by the NOA to the first UE and is in the service data to the another base station that is identified by the fourth identifying unit 407 and to which the first UE is handed over.

Figure 26:
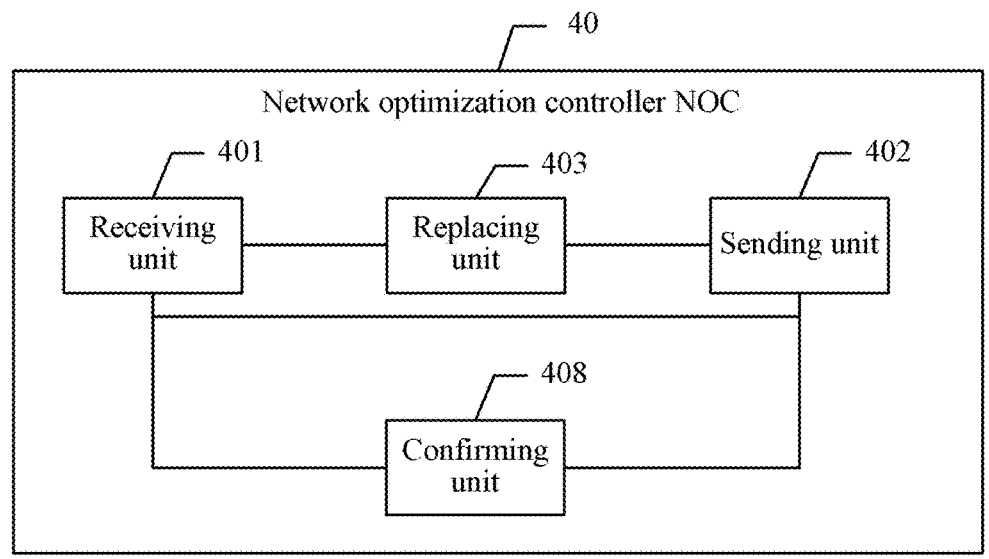
FIG. 26 is a schematic diagram of another embodiment of a network optimization controller NOC in the embodiments of the present invention.

Optionally, based on the embodiment corresponding to FIG. 21, referring to FIG. 26, in another embodiment of the NOC provided in the embodiments of the present invention, the NOC further includes a confirming unit 408, where the receiving unit 401 is further configured to receive a data retransmission instruction sent by the first UE;

the confirming unit 408 is configured to confirm, according to the data retransmission instruction received by the receiving unit 401, that the NOA is faulty; and the sending unit 402 is further configured to: when the confirming unit 408 confirms that the NOA is faulty, send a remaining data segment that has not been sent by the NOA to the first UE and is in the service data to a base station in which the first UE is located.

Figure 27:
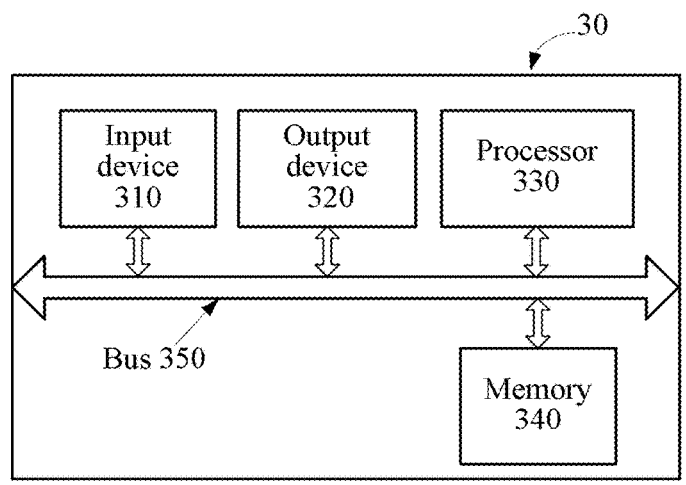
FIG. 27 is a schematic diagram of another embodiment of a network optimization agent NOA in the embodiments of the present invention.

FIG. 27 is a schematic structural diagram of a network optimization agent 30 according to an embodiment of the present invention. The method is applied to a wireless communications system, the wireless communications system includes: a base station, a gateway, the network optimization agent NOA, a network optimization controller NOC, and a service provider (SP) server, the NOA is deployed on the base station side, the NOC is deployed on the gateway side, and the network optimization agent 30 includes: an input device 310, an output device 320, a processor 330, and a memory 340.

The memory 340 may include a read-only memory and a random access memory, and provide instructions and data to the processor 330. A part of the memory 340 may further include a non-volatile random access memory (NVRAM).

The memory 340 stores the following elements, executable modules or data structures, or a subset thereof, or an extension set thereof:

operation instructions: including various operation commands, used for implementing various operations; and an operating system: including various system programs, used for implementing various basic services and process hardware based tasks.

In this embodiment of the present invention, the processor 330 performs the following operations by invoking operation instructions stored in the memory 340 (the operation instructions may be stored in the operating system):

receiving a service request of a first user equipment UE by using the input device 310, and forwarding the service request to the SP server by using the NOC, so that the SP server returns, according to the service request, service data requested by the first UE;

determining whether the service data has been stored in the NOA; and if determining that the service data has been stored in the NOA, sending hit indication information to the NOC by using the output device 320, so that the NOC replaces a data segment in the service data with preconfigured replacement information according to the hit indication information, where bandwidth occupied by the preconfigured replacement information is smaller than bandwidth occupied by the data segment; and receiving the replacement information sent by the NOC, determining the corresponding data segment according to the replacement information, and sending the data segment, which has been stored, to the first UE.

In this embodiment of the present invention, when service data is requested for a first time, the network optimization agent 30 can store the service data, so that when the service data is requested for a second time, a network optimization controller NOC does not need to send the service data one more time, and instead, after the NOC completes charging, the NOA sends the service data to a UE, which reduces the data volume of a Backhaul, thereby reducing the Backhaul bandwidth occupancy.

The processor 330 controls operations of the network optimization agent 30, and the processor 330 may also be referred to as a CPU (Central Processing Unit, central processing unit). The memory 340 may include a read-only memory and a random access memory, and provide instructions and data to the processor 330. A part of the memory 340 may further include a non-volatile random access memory (NVRAM). In specific application, components of the network optimization agent 30 are coupled together by using a bus system 350, where besides a data bus, the bus system 350 may further include a power bus, a control bus, a status signal bus, and the like. However, for clear description, various buses in the figure all are marked as the bus system 350.

The method disclosed in the foregoing embodiments of the present invention may be applied in the processor 330, or be implemented by the processor 330. The processor 330 may be an integrated circuit chip and has a signal processing capability. In an implementation process, the steps in the foregoing method may be completed by using an integrated logical circuit of hardware in the processor 330 or an instruction in a form of software. The processor 330 may be a general-purpose processor, a digital signal processor (DSP), an application-specific integrated circuit (ASIC), a field programmable gate array (FPGA) or other programmable logic devices, a discrete gate or a transistor logic device, or a discrete hardware component. The processor can implement or execute the methods, steps, and logical block diagrams disclosed in the embodiments of the present invention. The general-purpose processor may be a microprocessor or the processor may be any regular processor. In combination with the methods disclosed in the embodiment of the present invention, the steps may be directly embodied as being implemented by a hardware decoding processor, or implemented by a combination of hardware and software modules in a decoding processor. A software module may be located in a mature storage medium in the field, such as a random access memory, a flash memory, a read-only memory, a programmable read-only memory, or an electrically erasable programmable memory, or a register. The storage medium is located in the memory 340. The processor 330 reads information from the memory 340 and completes the steps of the foregoing methods with hardware thereof.

Optionally, the output device 320 is further configured to: when it is determined that the service data is not stored in the NOA, send miss indication information to the NOC, so that the NOC sends a data segment included in the service data to the NOA according to the miss indication information, and the data segment is received from the NOC, and the received data segment is stored in the NOA; and the output device 320 is further configured to: when a second UE requests the service data, send the data segment, which has been stored, to the second UE.

Optionally, the input device 310 is further configured to receive a first response packet sent by the NOC, where the first response packet carries a first data segment segment in the service data requested by the first UE; and the processor 330 specifically may generate first index information according to the first data segment, and query whether the first index information has been stored in the NOA; and if the first index information has been stored in the NOA, determine that the service data has been stored in the NOA; if the first index information is not stored in the NOA, determine that the service data is not stored in the NOA.

Optionally, the processor 330 specifically may parse the service request to obtain a service identifier; generate second index information according to the service identifier; query whether the second index information has been stored in the NOA; and if the second index information has been stored in the NOA, determine that the service data has been stored in the NOA; if the second index information is not stored in the NOA, determine that the service data is not stored in the NOA.

Figure 28:
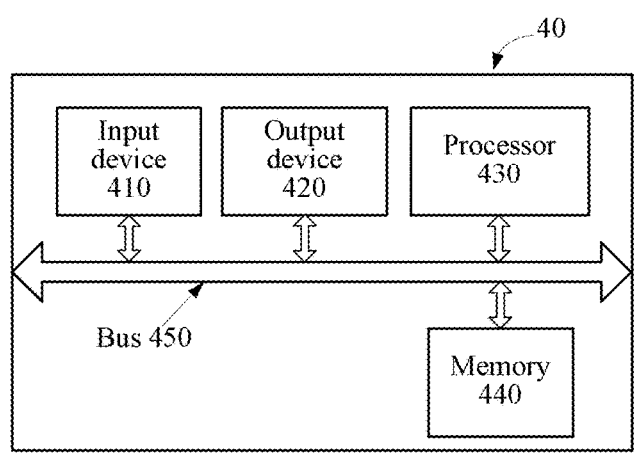
FIG. 28 is a schematic diagram of another embodiment of a network optimization controller NOC in the embodiments of the present invention.

FIG. 28 is a schematic structural diagram of a network optimization controller 40 according to an embodiment of the present invention. The method is applied to a wireless communications system, the wireless communications system includes: a base station, a gateway, a network optimization agent NOA, the network optimization controller NOC, and a service provider (SP) server, the NOA is deployed on the base station side, the NOC is deployed on the gateway side, and the network optimization controller 40 includes: an input device 410, an output device 420, a processor 430, and a memory 440.

The memory 440 may include a read-only memory and a random access memory, and provide instructions and data to the processor 430. A part of the memory 440 may further include a non-volatile random access memory (NVRAM).

The memory 440 stores the following elements, executable modules or data structures, or a subset thereof, or an extension set thereof:

operation instructions: including various operation commands, used for implementing various operations; and an operating system: including various system programs, used for implementing various basic services and process hardware based tasks.

In this embodiment of the present invention, the processor 430 performs the following operations by invoking operation instructions stored in the memory 440 (the operation instructions may be stored in the operating system):

receiving, by using the input device 410, a service request that is of a first user equipment UE and is forwarded by the NOA, and forwarding the service request to the SP server, so that the SP server returns, according to the service request, service data requested by the first UE;

receiving, by using the input device, hit indication information sent by the NOA; and replacing a data segment in the service data with preconfigured replacement information according to the hit indication information, where bandwidth occupied by the preconfigured replacement information is smaller than bandwidth occupied by the data segment, and sending the replacement information to the NOA, so that the NOA queries the corresponding data segment according to the replacement information, and sends the data segment, which has been stored, to the first UE.

In this embodiment of the present invention, when service data is requested for a first time, the network optimization controller 40 can store the service data in an NOA, so that when the service data is requested for a second time, the network optimization controller NOC does not need to send the service data one more time, and instead, after the NOC completes charging, the NOA sends the service data to a UE, which reduces the data volume of a Backhaul, thereby reducing the Backhaul bandwidth occupancy.

The processor 430 controls operations of the network optimization controller 40, and the processor 430 may also be referred to as a CPU (Central Processing Unit, central processing unit). The memory 440 may include a read-only memory and a random access memory, and provide instructions and data to the processor 430. A part of the memory 440 may further include a non-volatile random access memory (NVRAM). In specific application, components of the network optimization controller 40 are coupled together by using a bus system 450, where besides a data bus, the bus system 450 may further include a power bus, a control bus, a status signal bus, and the like. However, for clear description, various buses in the figure all are marked as the bus system 450.

The method disclosed in the foregoing embodiments of the present invention may be applied in the processor 430, or be implemented by the processor 430. The processor 430 may be an integrated circuit chip and has a signal processing capability. In an implementation process, the steps in the foregoing method may be completed by using an integrated logical circuit of hardware in the processor 430 or an instruction in a form of software. The processor 430 may be a general-purpose processor, a digital signal processor (DSP), an application-specific integrated circuit (ASIC), a field programmable gate array (FPGA) or other programmable logic devices, a discrete gate or a transistor logic device, or a discrete hardware component. The processor can implement or execute the methods, steps, and logical block diagrams disclosed in the embodiments of the present invention. The general-purpose processor may be a microprocessor or the processor may be any regular processor. In combination with the methods disclosed in the embodiment of the present invention, the steps may be directly embodied as being implemented by a hardware decoding processor, or implemented by a combination of hardware and software modules in a decoding processor. A software module may be located in a mature storage medium in the field, such as a random access memory, a flash memory, a read-only memory, a programmable read-only memory, or an electrically erasable programmable memory, or a register. The storage medium is located in the memory 440. The processor 430 reads information from the memory 440 and completes the steps of the foregoing methods with hardware thereof.

Optionally, the output device 420 may further: when miss indication information is received, send a data segment included in the service data to the NOA according to the miss indication information, so that the NOA stores the received data segment to the NOA, and when a second UE requests the service data, the NOA sends the data segment, which has been stored, to the second UE.

Optionally, the input device 410 is further configured to receive the one or more response packets sent by the SP server; and the output device 420 is further configured to send the one or more response packets to the NOA, where a first response packet in the one or more response packets carries a first data segment in the service data requested by the first UE, so that the NOA generates first index information according to the first data segment.

Optionally, the input device 410 is further configured to receive the first index information and second index information that are sent by the NOA, where the second index information is generated by the NOA according to a service identifier obtained by parsing the service request.

Optionally, the processor 430 is further configured to: when the data segment is sent to the NOA, identify that the first UE is handed over to another base station, and another NOA is deployed on the another base station side; and the output device 420 is further configured to send the first index information or the second index information, and a remaining data segment that has not been sent to the NOA and is in the service data to the another NOA, so that the another NOA correspondingly stores the first index information or the second index information, and the remaining data segment.

Optionally, the processor 430 is further configured to: when the data segment is sent to the NOA, identify that the first UE is handed over to another base station, and no other NOA is deployed on the another base station side; and the output device 420 is further configured to send the remaining data segment that has not been sent to the NOA and is in the service data to the another base station.

Optionally, the processor 430 is further configured to: when the replacement information is sent to the NOA, identify that the first UE is handed over to another base station, and another NOA is deployed on the another base station side; and the output device 420 is further configured to send the first index information or the second index information, and a remaining data segment that has not been sent by the NOA to the first UE and is in the service data to the another NOA, so that the another NOA correspondingly stores the first index information or the second index information, and the remaining data segment.

Optionally, the processor 430 is further configured to: when the replacement information is sent to the NOA, identify that the UE is handed over to another base station, and no other NOA is deployed on the another base station side; and the output device 420 is further configured to send a remaining data segment that has not been sent by the NOA to the first UE and is in the service data to the another base station.

Optionally, the input device 410 is further configured to: if a data retransmission instruction sent by the first UE is received, and it is confirmed that the NOA is faulty, send a remaining data segment that has not been sent by the NOA to the first UE and is in the service data to a base station in which the first UE is located.

Figure 29:
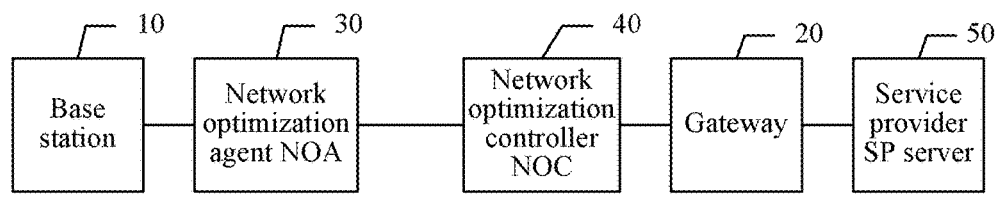
FIG. 29 is a schematic diagram of an embodiment of a wireless communications system in the embodiments of the present invention.

Referring to FIG. 29, an embodiment of a wireless communications system provided in the embodiments of the present invention includes:

a base station 10, a gateway 20, a network optimization agent NOA 30, a network optimization controller NOC 40, and a service provider (SP) server 50, where the NOA 30 is deployed on the base station 10 side, and the NOC 40 is deployed on the gateway 20 side, the NOA 30 is configured to receive a service request of a first user equipment UE, and forward the service request to the SP server 50 by using the NOC, so that the SP server returns, according to the service request, service data requested by the first UE; determine whether the service data has been stored in the NOA; and if determining that the service data has been stored in the NOA, send hit indication information to the NOC;

the NOC 40 replaces a data segment in the service data with preconfigured replacement information according to the hit indication information, where bandwidth occupied by the preconfigured replacement information is smaller than bandwidth occupied by the data segment; and the NOA 30 receives the replacement information sent by the NOC, determines the corresponding data segment according to the replacement information, and sends the data segment, which has been stored, to the first UE.

A person of ordinary skill in the art may understand that all or some of the steps of the methods in the embodiments may be implemented by a program instructing relevant hardware (such as a processor). The program may be stored in a computer readable storage medium. The storage medium may include: a ROM, a RAM, a magnetic disk, or an optical disc.

The service data management method, the apparatus, and the system provided in the embodiments of the present invention are described above in detail. Although the principles and implementation manners of the present invention are described by using specific embodiments in this specification, the foregoing descriptions of the embodiments are only intended to help understand the method and core idea of the method of the present invention. Meanwhile, a person of ordinary skill in the art may make modifications to the specific implementation manners and application range according to the idea of the present invention. In conclusion, the content of the specification should not be construed as a limitation to the present invention.

What is claimed is:

1. A service data management method, wherein the method is applied to a wireless communications system, the wireless communications system comprises: a base station, a gateway, a network optimization agent (NOA), a network optimization controller (NOC), and a service provider (SP) server, the NOA is deployed on the base station side, the NOC is deployed on the gateway side, and the method comprises:

receiving, by the NOA, a service request of a first user equipment (UE), and forwarding the service request to the SP server by using the NOC, to cause the SP server to return, according to the service request, service data requested by the first UE;

determining, by the NOA, whether the service data has been stored in the NOA; and when the NOA determines that the service data has been stored in the NOA, sending hit indication information to the NOC, to cause the NOC to replace a data segment in the service data with preconfigured replacement information according to the hit indication information, wherein bandwidth occupied by the preconfigured replacement information is smaller than bandwidth occupied by the data segment; and receiving the replacement information sent by the NOC, determining the corresponding data segment according to the replacement information, and sending the data segment, which has been stored, to the first UE.

2. The method according to claim 1, wherein the method further comprises:

when it is determined that the service data is not stored in the NOA, sending miss indication information to the NOC, to cause the NOC to send a data segment comprised in the service data to the NOA according to the miss indication information, receiving the data segment from the NOC, and storing the received data segment to the NOA; and in a case that a second UE requests the service data, sending, by the NOA to the second UE, the data segment that has been stored.

3. The method according to claim 2, wherein that the SP server returns service data requested by the first UE comprises:

adding, by the SP server, the data segment comprised in the service data to one or more response packets, and sending the one or more response packets to the NOC; and the determining whether the service data has been stored in the NOA comprises:

receiving a first response packet sent by the NOC, wherein the first response packet carries a first data segment in the service data requested by the first UE;

generating first index information according to the first data segment;

querying whether the first index information has been stored in the NOA; and in a case that the first index information has been stored in the NOA, determining that the service data has been stored in the NOA;

in a case that the first index information is not stored in the NOA, determining that the service data is not stored in the NOA.

4. The method according to claim 2, wherein the determining whether the service data has been stored in the NOA comprises:

parsing the service request to obtain a service identifier;
generating second index information according to the service identifier;
querying whether the second index information has been stored in the NOA; and
in a case that the second index information has been stored in the NOA, determining that the service data has been stored in the NOA;
in a case that the second index information is not stored in the NOA, determining that the service data is not stored in the NOA.

5. A service data management method, wherein the method is applied to a wireless communications system, the wireless communications system comprises: a base station, a gateway, a network optimization agent (NOA), a network optimization controller (NOC), and a service provider (SP) server, the NOA is deployed on the base station side, the NOC is deployed on the gateway side, and the method comprises:

receiving, by the NOC, a service request that is of a first user equipment (UE) and is forwarded by the NOA, and forwarding the service request to the SP server, to cause the SP server to return, according to the service request, service data requested by the first UE; and when receiving hit indication information sent by the NOA, replacing a data segment in the service data with preconfigured replacement information according to the hit indication information, wherein bandwidth occupied by the preconfigured replacement information is smaller than bandwidth occupied by the data segment, and sending the replacement information to the NOA, to cause the NOA to query the corresponding data segment according to the replacement information, and to send the data segment, which has been stored, to the first UE.

6. The method according to claim 5, wherein the method further comprises:

when receiving miss indication information, sending a data segment comprised in the service data to the NOA according to the miss indication information, to cause the NOA to store the received data segment to the NOA, and when a second UE requests the service data, to cause the NOA to send the data segment, which has been stored, to the second UE.

7. The method according to claim 6, wherein that the SP server returns service data requested by the first UE comprises:

adding, by the SP server, the data segment comprised in the service data to one or more response packets, and sending the one or more response packets to the NOC; and receiving, by the NOC, the one or more response packets sent by the SP server, and sending the one or more response packets to the NOA, wherein a first response packet in the one or more response packets carries a first data segment in the service data requested by the first UE, to cause the NOA to generate first index information according to the first data segment.

8. The method according to claim 7, wherein the method further comprises:

receiving the first index information and second index information that are sent by the NOA, wherein the second index information is generated by the NOA according to a service identifier obtained by parsing the service request.

9. The method according to claim 8, wherein the method further comprises:

it is identified, when the data segment is sent to the NOA, that the first UE is handed over to another base station, and another NOA is deployed on the another base station side, then sending the first index information or the second index information, and a remaining data segment that has not been sent to the NOA and is in the service data to the another NOA, to cause the another NOA correspondingly to store the first index information or the second index information, and the remaining data segment.

10. The method according to claim 8, wherein the method further comprises:

it is identified, when the data segment is sent to the NOA, that the first UE is handed over to another base station, and no other NOA is deployed on the another base station side, then sending a remaining data segment that has not been sent to the NOA and is in the service data to the another base station.

11. The method according to claim 8, wherein the method further comprises:

it is identified, when the data segment is sent to the NOA, that the first UE is handed over to another base station, and another NOA is deployed on the another base station side, then sending the first index information or the second index information, and a remaining data segment that has not been sent by the NOA to the first UE and is in the service data to the another NOA to cause the another NOA correspondingly to store the first index information or the second index information, and the remaining data segment.

12. The method according to claim 8, wherein it is identified, when the replacement information is sent to the NOA, that the first UE is handed over to another base station, and no other NOA is deployed on the another base station side, then a remaining data segment that has not been sent by the NOA to the first UE and is in the service data is sent to the another base station.

13. The method according to claim 5, wherein the method further comprises:

When a data retransmission instruction sent by the first UE is received, and it is confirmed that the NOA is faulty, sending a remaining data segment that has not been sent by the NOA to the first UE and is in the service data to a base station in which the first UE is located.

14. A network optimization agent (NOA), wherein the NOA is applied to a wireless communications system, the wireless communications system comprises: a base station, a gateway, a network optimization controller (NOC), and a service provider (SP) server, the NOA is deployed on the base station side, the NOC is deployed on the gateway side, and the NOA comprises:

a memory to store instructions; and
a processor to execute the instructions to cause the NOA to:
receive a service request of a first user equipment (UE);
forward the service request received by the NOA to the SP server by using the NOC, to cause the SP server to return, according to the service request, service data requested by the first UE;
determine whether the service data has been stored in the NOA;
when the NOA determines that the service data has been stored in the NOA, send hit indication information to the NOC, to cause the NOC to replace a data segment in the service data with preconfigured replacement information according to the hit indication information, wherein bandwidth occupied by the preconfigured replacement information is smaller than bandwidth occupied by the data segment;
receive the replacement information sent by the NOC;
determine the corresponding data segment according to the replacement information received by the NOA; and
send the data segment that has been stored and is determined by the NOA to the first UE.

15. The NOA according to claim 14, wherein the processor further executes the instructions to cause the NOA to:
when the NOA determines that the service data is not stored in the NOA, send miss indication information to the NOC, to cause the NOC to send a data segment comprised in the service data to the NOA according to the miss indication information;

receive the data segment from the NOC;

store the data segment received by the NOA; and when a second UE requests the service data, send the data segment stored by the NOA to the second UE.

16. The NOA according to claim 15, wherein the SP server adds the data segment comprised in the service data to one or more response packets, and sends the one or more response packets to the NOC; and the processor further executes the instructions to cause the NOA to:

receive a first response packet sent by the NOC, wherein the first response packet carries a first data segment in the service data requested by the first UE;

generate first index information according to the first data segment received by the;

query whether the first index information generated by the NOA has been stored in the NOA; and when the NOA queries that the first index information has been stored in the NOA, determine that the service data has been stored in the NOA; and when the NOA queries that the first index information is not stored in the NOA, determine that the service data is not stored in the NOA.

17. The NOA according to claim 15, wherein the processor further executes the instructions to cause the NOA to:

parse the service request to obtain a service identifier;

generate second index information according to the service identifier obtained by the NOA by parsing;

query whether the second index information generated by the NOA has been stored in the NOA; and when the NOA queries that the second index information has been stored in the NOA, determine that the service data has been stored in the NOA; and when the NOA queries that the second index information is not stored in the NOA, determine that the service data is not stored in the NOA.

18. A network optimization controller (NOC), wherein the NOC is applied to a wireless communications system, the wireless communications system comprises: a base station, a gateway, a network optimization agent (NOA), and a service provider (SP) server, the NOA is deployed on the base station side, the NOC is deployed on the gateway side, and the NOC comprises:

a memory to store instructions; and a processor to execute the instructions to cause the NOC to:

receive a service request that is of a first user equipment (UE) and is forwarded by the NOA;

forward the service request received by the NOC to the SP server, to cause the SP server to return, according to the service request, service data requested by the first UE;

receive hit indication information sent by the NOA; and when the NOC receives the hit indication information sent by the NOA, replace a data segment in the service data with preconfigured replacement information according to the hit indication information, wherein bandwidth occupied by the preconfigured replacement information is smaller than bandwidth occupied by the data segment; and send the replacement information used by the NOC for replacement to the NOA, to cause the NOA to query the corresponding data segment according to the replacement information, and to send the data segment, which has been stored, to the first UE.

19. The NOC according to claim 18, wherein the processor further executes the instructions to cause the NOC to:

receive miss indication information;

when the NOC receives the miss indication information, send a data segment comprised in the service data to the NOA according to the miss indication information, to cause the NOA to store the received data segment to the NOA; and when a second UE requests the service data, the NOA sends the data segment, which has been stored, to the second UE.

20. The NOC according to claim 19, wherein the SP server adds the data segment comprised in the service data to one or more response packets, and sends the one or more response packets to the NOC;

the processor further executes the instructions to cause the NOC to:

receive the one or more response packets sent by the SP server; and send the one or more response packets to the NOA, wherein a first response packet in the one or more response packets carries a first data segment in the service data requested by the first UE, to cause the NOA to generate first index information according to the first data segment.

21. The NOC according to claim 20, wherein the processor further executes the instructions to cause the NOC to:

receive the first index information and second index information that are sent by the NOA, wherein the second index information is generated by the NOA according to a service identifier obtained by parsing the service request.

22. The NOC according to claim 21, wherein processor further executes the instructions to cause the NOC to:

when the NOC sends the data segment to the NOA, identify that the first UE is handed over to another base station, and another NOA is deployed on the another base station side; and send the first index information or the second index information, and a remaining data segment that has not been sent to the NOA and is in the service data to the another NOA that is identified by the NOC after the first UE is handed over, to cause the another NOA correspondingly to store the first index information or the second index information, and the remaining data segment.

23. The NOC according to claim 21, wherein the processor further executes the instructions to cause the NOC to:

when the NOC sends the data segment to the NOA, identify that the first UE is handed over to another base station, and no other NOA is deployed on the another base station side; and send a remaining data segment that has not been sent to the NOA and is in the service data to the another base station that is identified by the NOC and to which the first UE is handed over.

24. The NOC according to claim 21, wherein the processor further executes the instructions to cause the NOC to:

when the replacement information is sent to the NOA, identify that the first UE is handed over to another base station, and another NOA is deployed on the another base station side; and send the first index information or the second index information, and a remaining data segment that has not been sent by the NOA to the first UE and is in the service data to the another NOA that is identified by the NOC after the first UE is handed over, to cause the another NOA correspondingly to store the first index information or the second index information, and the remaining data segment.

25. The NOC according to claim 21, wherein the processor further executes the instructions to cause the NOC to:
when the replacement information is sent to the NOA, identify that the first UE is handed over to another base station, and no other NOA is deployed on the another base station side; and
send a remaining data segment that has not been sent by the NOA to the first UE and is in the service data to the another base station that is identified by the NOC and to which the first UE is handed over.

26. The NOC according to claim 18, wherein the processor further executes the instructions to cause the NOC to:
receive a data retransmission instruction sent by the first UE;
confirm, according to the data retransmission instruction received by the NOC, that the NOA is faulty; and
when the NOC confirms that the NOA is faulty, send the remaining data segment that has not been sent by the NOA to the first UE and is in the service data to a base station in which the first UE is located.

27. A wireless communications system, comprising: a base station, a gateway, a network optimization agent (NOA), a network optimization controller (NOC), and a service provider (SP) server, wherein the NOA is deployed on the base station side, and the NOC is deployed on the gateway side,
wherein the NOA comprises:
a memory to store instructions; and
a processor to execute the instructions to cause the NOA to:
receive a service request of a first user equipment (UE);
forward the service request received by the NOA to the SP server by using the NOC, to cause the SP server to return, according to the service request, service data requested by the first UE; and
determine whether the service data has been stored in the NOA;
when the NOA determines that the service data has been stored in the NOA, send hit indication information to the NOC, to cause the NOC to replace a data segment in the service data with preconfigured replacement information according to the hit indication information, wherein bandwidth occupied by the preconfigured replacement information is smaller than bandwidth occupied by the data segment;
receive the replacement information sent by the NOC;
determine the corresponding data segment according to the replacement information received by the NOA; and
send the data segment that has been stored and is determined by the NOA to the first UE; and
wherein the NOC comprises:
a memory to store instructions; and
a processor to execute the instructions to cause the NOC to:
receive a service request that is of a first user equipment (UE) and is forwarded by the NOA;
forward the service request received by the NOC to the SP server, to cause the SP server to return, according to the service request, service data requested by the first UE;
receive hit indication information sent by the NOA; and
when the NOC receives the hit indication information sent by the NOA, replace a data segment in the service data with preconfigured replacement information according to the hit indication information, wherein bandwidth occupied by the preconfigured replacement information is smaller than bandwidth occupied by the data segment; and
send the replacement information used by the NOC for replacement to the NOA, to cause the NOA to query the corresponding data segment according to the replacement information, and to send the data segment, which has been stored, to the first UE.

* * * * *